United States Patent [19]
Kanazawa

[11] Patent Number: 6,035,417
[45] Date of Patent: Mar. 7, 2000

[54] METHOD AND SYSTEM FOR TAKING OVER DATA AND DEVICE FOR PROCESSING DATA

[75] Inventor: Yuji Kanazawa, Kawasaki, Japan

[73] Assignee: Fujitsu Limited, Kawasaki, Japan

[21] Appl. No.: 08/834,276

[22] Filed: Apr. 15, 1997

Related U.S. Application Data

[63] Continuation of application No. 08/385,430, Feb. 8, 1995, abandoned.

[30] Foreign Application Priority Data

Mar. 18, 1994 [JP] Japan .................................. 6-049475

[51] Int. Cl.$^7$ .................................................... G06F 11/00
[52] U.S. Cl. ............................................... 714/13; 714/20
[58] Field of Search .......................... 395/182.18, 182.11, 395/182.13, 182.09, 182.01, 182.02, 182.24; 714/20, 13, 15

[56] References Cited

U.S. PATENT DOCUMENTS

| | | | |
|---|---|---|---|
| 5,134,712 | 7/1992 | Yamamoto | 395/800 |
| 5,235,700 | 8/1993 | Alaiwan et al. | 395/575 |
| 5,434,994 | 7/1995 | Shaheen et al. | 395/500 |
| 5,555,371 | 9/1996 | Duyanovich et al. | 395/182.11 |
| 5,664,090 | 9/1997 | Seki et al. | 395/182.13 |
| 5,696,895 | 12/1997 | Hemphill et al. | 395/182.02 |

*Primary Examiner*—Norman Michael Wright
*Attorney, Agent, or Firm*—Staas & Halsey

[57] ABSTRACT

In a system for taking over data of the present invention, a first data processing unit processes a processing data following an execution of a program. A second data processing unit transfers a takeover data necessary for resuming a process from the first data processing unit, when there is some trouble with the first data processing unit. A volatile storage unit stores the takeover data and the processing data to be processed by the first data processing unit. A change unit changes the takeover data stored in the volatile storage unit into a new takeover data following the execution of the program by the first data processing unit. A nonvolatile storage unit is connected to the first data processing unit and the second data processing unit, and stores the takeover data. A demanding unit issues a transmission demand for transmitting the processing data stored in the volatile storage unit to one of the nonvolatile storage unit and a network. A rewriting unit rewrites the takeover data stored in the nonvolatile storage unit into the new takeover data changed by the change unit when the demanding unit issued the transmission demand.

7 Claims, 19 Drawing Sheets

METHOD AND SYSTEM FOR TAKING OVER DATA AND DEVICE FOR PROCESSING DATA

This application is a continuation of application Ser. No. 08/385,430, filed Feb. 8, 1995, now abandoned.

BACKGROUND OF THE INVENTION

The present invention is related to a method and a system for taking over data and a device for processing data which continues a process by taking over a takeover data of a current system processing unit to a spare system processing unit, when there is some trouble with the current system processing unit.

Up to the present, there has been some cases that a trouble occurs due to some causes in the current system computer while the computer is processing a data. In such case, the spare system computer will store the takeover data in a memory, when the current system computer transmits the processed transferring data through the network to the spare system computer. Namely, the current system computer takes over the takeover data to the spare system computer. Then the spare system computer resumes the process in accordance with the takeover data stored in the memory.

Some other systems store the takeover data in such nonvolatile memory as a memory attached to a battery backup, a disk and a tape. The nonvolatile memory will not destroy the stored takeover data even if a power supply within the computer is cut off. For this reason, the takeover data can be taken over through the nonvolatile memory.

The volatile memory destroys a stored takeover data when the power supply is cut off. For this reason, the volatile memory is not used for takeover data. Besides, it sometimes happens that the computer is reset or reactivated by the errors which occur in the core part of a memory, a central processing unit (CPU) and an operating system. Also in this case, volatile memory cannot be used for the takeover data.

A high-speed nonvolatile memory like the memory attached to the battery backup is expensive. For this reason, the expensive memory attached to the battery backup has not been used for general computers, but the disk and the tape have been used. Otherwise, the takeover data has been transmitted to the spare system computer to be stored in the memory.

However, both a data transferring speed of the disk and the magnetic tape and the data transferring speed to the spare system computer have been slow. The takeover data has been stored in a nonvolatile area of the disk one by one, whenever the takeover data was changed or added. For this reason, there has been a problem that it takes a lot of time to process the takeover data and the data processing ability is lowered.

SUMMARY OF THE INVENTION

An object of the present invention is to provide a method and a system for taking over data and a device for processing data which are capable of processing data at a high speed.

A SYSTEM FOR TAKING OVER DATA OF THE FIRST INVENTION

A system for taking over data of the first invention comprises a first and a second data processing unit, a volatile storage unit, a change unit, nonvolatile storage unit, a demanding unit and a rewriting unit. The first data processing unit processes a processing data after executing a program. The second data processing unit takes over the transferring data necessary for resuming a process from the first data processing unit, when there is some trouble with the first data processing unit.

The volatile storage unit stores the takeover data and a processing data. The change unit changes the takeover data stored in the volatile storage unit into a new takeover data following the execution of the program by the first data processing unit.

The nonvolatile storage unit is connected to the first data processing unit and the second data processing unit, and stores the takeover data.

The demanding unit issues a transmission demand for transmitting the processing data stored in the volatile storage unit to one of the nonvolatile storage unit and to the network. The rewriting unit rewrites the takeover data stored in the nonvolatile storage unit into the new takeover data changed by the change unit when the transmission demand was issued.

It is desirable that the volatile storage unit, the change unit, the demanding unit and the rewriting unit are provided with the first processing unit.

The system further comprises a trouble perception unit, a trouble determination unit and a takeover data readout unit. The trouble perception unit perceives a trouble when there is some trouble with the first data processing unit. For instance, a sensor is the trouble perception unit.

The trouble determination unit determines whether the trouble which occurred in the first data processing unit destroys the takeover data and the processing data stored in the volatile storage unit or not, on the basis of a perception signal outputted from the trouble perception unit. The takeover data readout unit reads out the takeover data stored in the volatile storage unit and the takeover data stored in the nonvolatile storage unit into the second processing unit, when the trouble does not destroy the takeover data and the processing data stored in the volatile storage unit.

It is desirable that the trouble perception unit, the trouble determination unit and the takeover data readout unit are provided with the second processing unit.

The system further comprises a trouble perception unit, a trouble determination unit and a takeover data readout unit. The constructions of the trouble perception unit and the trouble determination unit are the same as the abovementioned construction.

The takeover data readout unit reads out the takeover data stored in the volatile storage unit into the second data processing unit, when the trouble destroys the takeover data and the processing data stored in the volatile storage unit.

It is desirable that the trouble perception unit, trouble determination unit and the takeover data readout unit are provided with the second processing unit.

The system further includes a counting unit for counting a predetermined time from a time that the new takeover data changed by the change unit was stored in the volatile storage unit. The rewriting unit rewrites the takeover data stored in the nonvolatile storage unit into the changed new takeover data stored in the volatile storage unit, when the predetermined time was counted by the counting unit. It is desirable that the counting unit is provided with the first processing unit.

The system further includes a storage capacity determination unit for determining whether the predetermined capacity of the new takeover data changed by the change unit are stored in the volatile storage unit or not. The rewriting unit rewrites the takeover data stored in the nonvolatile storage unit, when it is determined that the predetermined capacity of the changed new takeover data are stored in the volatile storage unit. It is desirable that the storage capacity determination unit is provided with the first processing unit.

The system further includes a tag addition unit for adding a tag information to each of a plurality of takeover data so as to classify the each of plurality of takeover data in accordance with a kind of processing data. The rewriting unit reads only the takeover data corresponding to the tag information of the processing data out of the plurality of takeover data to rewrite the takeover data stored in the nonvolatile storage unit into the read takeover data. It is desirable that the tag addition unit is provided with the first processing unit.

Further, in the system, the rewriting unit can transmit the processing data through the network to a third data processing unit and rewrite the takeover data stored in the nonvolatile storage unit into the changed takeover data stored in the first volatile storage unit at the same time, and transfer an initiation permission message for permitting the third data processing unit to use the processing data to the third data processing unit at a time that rewriting of the takeover data was ended, when the first data processing unit and the second data processing unit are connected to the network.

A SYSTEM FOR TAKING OVER DATA OF THE SECOND INVENTION

Further, a system for taking over data of the second invention comprises a first and a second data processing unit, a first volatile storage unit, a change unit, a second volatile storage unit, a demanding unit and a rewriting unit. The first data processing unit is connected to a network and processes a processing data following an execution of a program.

The second data processing unit is connected to the network and takes over a takeover data necessary for resuming a process from the first data processing unit, when there is some trouble with the first data processing unit.

The first volatile storage unit stores the takeover data and the processing data. The change unit changes the takeover data stored in the volatile storage unit into a new takeover data following the execution of the program by the first data processing unit. The second volatile storage unit is provided with the second data processing unit and stores the takeover data. The demanding unit issues a transmission demand to the network of the processing data stored in the first volatile storage unit. Besides, the demanding unit will issue a transmission demand corresponding to the nonvolatile storage unit if the data processing unit has the nonvolatile storage unit. The rewriting unit rewrites the takeover data stored in the second volatile storage unit into the new takeover data changed by the change unit when the transmission demand was issued by the demanding unit.

It is desirable that the first volatile storage unit, the change unit and the rewriting unit are provided with the first processing unit.

In the system, the rewriting unit can transmit the processing data to a third data processing unit and rewrite the takeover data stored in the second volatile storage unit into the changed new takeover data stored in the first volatile storage unit, and transfer an initiation permission message for permitting the third data processing unit to use the processing data when the rewriting of the takeover data was ended.

Besides, the data processing unit which receives the processing data from the first data processing unit can be provided with a data input unit, a message determination unit for determining whether the initiation permission message was received from the first data processing unit or not and a data use initiation unit for starting to use the processing data from a time that the initiation permission message was received, when the initiation permission message was received from the first data processing unit.

A METHOD FOR TAKING OVER DATA OF THE THIRD INVENTION

In a method for taking over data of the third invention, the first data processing unit processes a processing data following an execution of a program and the second processing unit takes over the takeover data necessary for resuming a process from the first data processing unit to the second data processing unit, when there is some trouble with the first data processing unit. The method for taking over data of the third invention comprises a storage step, a change step, a demanding step and a rewriting step.

The storage step stores the takeover data and the processing data in a volatile memory and a nonvolatile memory.

The change step changes the takeover data stored in the volatile memory into a new takeover data following the execution of the program by the first data processing unit.

The demanding step issues a transmission demand to the nonvolatile memory of the processing data stored in the volatile memory. The demanding step also issues a transmission demand to the network, when the data processing unit is connected to the network.

The rewriting step rewrites the takeover data stored in the nonvolatile memory into the changed new takeover data when the transmission demand was issued.

The system for taking over data further comprises a perception step, a determination step and a readout step. The perception step perceives the trouble when there is some trouble with the first data processing unit. The determination step determines whether the trouble which occurred in the first data processing unit destroys the takeover data and the processing data stored in the volatile memory or not, on the basis of a perception signal.

The readout step reads out the takeover data stored in the volatile memory and the takeover data stored in the nonvolatile memory into the second data processing unit, when the trouble does not destroy the takeover data and the processing data stored in the volatile memory.

The method for taking over data further comprises a perception step, a determination step and a readout step. The perception step perceives the trouble when there is some trouble with the first data processing unit.

The determination step determines whether the trouble which occurred in the first data processing unit destroys the takeover data and the processing data stored in the volatile memory or not. The readout step reads out the takeover data stored in the nonvolatile memory into the second data processing unit, when the trouble destroys the takeover data and the processing data stored in the volatile memory.

The method for taking over data further includes a counting step for counting a predetermined time from a time that the changed new takeover data was stored in the volatile memory. The rewriting step rewrites the takeover data stored in the nonvolatile memory into the changed new takeover data stored in the volatile memory, when the predetermined time was counted.

The method for taking over data further includes a storage capacity determination step for determining whether the predetermined capacity of the changed new takeover data was stored in the volatile memory or not. The rewriting step rewrites the takeover data, when it is determined that the predetermined capacity of the changed new takeover data is stored in the volatile memory.

The method for taking over data further includes an addition step for adding a tag information to each of a plurality of takeover data so as to classify the each of plurality of takeover data in accordance with a kind of the processing data. The rewriting step reads only the takeover data corresponding to the tag information of the processing data out of the plurality of the takeover data to rewrite the takeover data stored in the nonvolatile memory into the takeover data.

Further, in the method for taking over data, the rewriting step can transmit the processing data through the network to a third data processing unit and rewrite the takeover data stored in the nonvolatile memory into the changed new takeover data stored in the volatile memory at the same time, and transfer an initiation permission message for permitting the third data processing unit to use the processing data to the third data processing unit at a time that the rewriting of the takeover data was ended, when the network is connected.

A METHOD FOR TAKING OVER DATA OF THE FOURTH INVENTION

In a method for taking over data of the fourth invention, the first data processing unit processes a processing data following an execution of a program, the second data processing unit takes over a takeover data necessary for resuming a process from the first data processing unit to the second data processing unit, when there is some trouble with the first data processing unit. The method for taking over data comprises a storage step, a change step, a demanding step and a rewriting step.

The storage step stores the takeover data and the processing data in the first volatile memory and the second volatile memory. The change step changes the takeover data stored in the first volatile memory into a new takeover data following the execution of the program by the first data processing unit.

The demanding step issues a transmission demand to the network of the processing data stored in the first volatile memory. Besides, it also issues a transmission demand to the nonvolatile memory, when the data processing unit has a nonvolatile memory. The rewriting step rewrites the takeover data stored in the second volatile memory into the changed new takeover data when the transmission demand was issued.

Further, the rewriting step transmits the processing data through the network to the third data processing unit and rewrites the takeover data stored in the second volatile memory into the changed new takeover data stored in the first volatile memory, and transfers an initiation permission message for permitting the third data processing unit to use the processing data to the third data processing unit, when the rewriting of the takeover data was ended.

Further, the method for taking over data can be provided with an input step for receiving a processing data and a takeover data from the first data processing unit, a determination step for determining whether an initiation permission message was received from the first data processing unit or not and a use initiation step for starting to use the processing data and the takeover data from a time that the initiation permission message was received, when the initiation permission message was received from the first data processing unit.

A DEVICE FOR PROCESSING DATA OF THE FIFTH INVENTION

A device for processing data of the fifth invention processes a processing data following an execution of a program and takes over a takeover data necessary for resuming a process to a nonvolatile storage unit, when the trouble occurred. The device for processing data comprises a volatile storage unit, a change unit, a demanding unit and a rewriting unit.

The volatile storage unit stores the takeover data and the processing data. The change unit changes the takeover data stored in the volatile storage unit into a new takeover data following the execution of the program. The demanding unit issues a transmission demand to the nonvolatile storage unit of the processing data. Besides, the demanding unit also issues a transmission demand for the network when the data processing unit is connected to the network. The rewriting unit rewrites the takeover data stored in the nonvolatile storage unit into the takeover data changed by the change unit when the transmission demand was issued by the demanding unit.

A DEVICE FOR PROCESSING DATA OF THE SIXTH INVENTION

A device for processing data of the sixth invention processes a processing data following an execution of a program and takes over a takeover data necessary for resuming a program through the network to a destination data processing unit, when the trouble occurred. The data processing unit comprises a volatile storage unit, a change unit, a demanding unit and a rewriting unit.

The volatile storage unit stores the takeover data and the processing data. The change unit changes the takeover data stored in the volatile storage unit into a new takeover data following the execution of the program. The demanding unit issues a transmission demand to the network of the processing data stored in the volatile storage unit. Besides, it also issues a transmission demand to the nonvolatile storage unit, when the data processing unit has a nonvolatile storage unit. The rewriting unit is provided with a rewriting unit for rewriting the takeover data stored in the destination data processing unit into the new takeover data changed by the change unit when the transmission demand was issued by the demanding unit.

The rewriting unit can transmit the processing data through the network to other data processing unit and rewrite the takeover data stored in the destination data processing unit into the changed new takeover data stored in the volatile storage unit at the same time, and transfer the initiation permission message for permitting the other data processing unit of the processing data to use the processing data to the other data processing unit when rewriting of the processing data was ended.

A METHOD FOR TAKING OVER DATA OF THE SEVENTH INVENTION

A method for taking over data of the seventh invention processes a processing data following an execution of a program and takes over a takeover data necessary for resuming a process to a nonvolatile memory, when the trouble occurred. The method for taking over data comprises a storage step, a change step, a demanding step and a rewriting step.

The storage step stores the takeover data and the processing data in the volatile memory. The change step changes the takeover data stored in the volatile memory into a new takeover data following the execution of the program. The demanding step issues a transmission demand to the nonvolatile memory of the processing data stored in the volatile memory. Besides it also issues a transmission demand to the network, when the data processing unit is connected to the network.

The rewriting step rewrites the takeover data stored in the volatile memory into the changed new takeover data when the transmission demand was issued.

A METHOD FOR TAKING OVER DATA OF THE EIGHTH INVENTION

A method for taking over data of the eighth invention processes a processing data following an execution of a program and takes over a takeover data necessary for resuming a process through a network to a destination data processing unit, when the trouble occurred. The method for taking over data comprises a storage step, a change step, a demanding step and a rewriting step.

The storage step stores the takeover data and the processing data in the volatile memory. The change step the takeover data stored in the volatile memory into a new takeover data following the execution of the program. The demanding step issues a transmission demand to the network of the processing data stored in the volatile memory. Besides, it also issues a transmission demand to the nonvolatile memory, when the data processing unit has a nonvolatile memory.

The rewriting step rewrites the takeover data stored in the destination data processing unit when the transmission demand was issued.

The rewriting step can transmit the processing data to the network and rewrite the takeover data stored in the destination data processing unit into the changed new takeover data stored in the volatile memory, and transfer an initiation permission message for permitting the other data processing unit to use the processing data to the other data processing unit when the rewriting of the takeover data was ended.

EFFECT OF THE INVENTIONS

The rewriting unit rewrites the takeover data stored in the nonvolatile storage unit into the new takeover data changed by the change unit, only when the demanding unit issued a transmission demand to one of the nonvolatile storage unit and the network of the processing data stored in the volatile storage unit. For this reason, the frequency of the rewriting will be diminished drastically and the processing time can be reduced, compared with the case that the rewriting of the takeover data stored in the nonvolatile storage unit is executed whenever the takeover data is changed.

Besides, the trouble determination unit may determine whether the trouble which occurred in the first data processing unit destroys the takeover data and the processing data stored in the volatile storage unit, on the basis of a perception signal outputted from the trouble perception unit. The takeover data readout unit can read out the takeover data stored in the volatile storage unit and the takeover data stored in the nonvolatile storage unit into the second data processing unit, when the trouble does not destroy the takeover data and the processing data stored in the volatile storage unit. Accordingly, the second data processing unit can get a newest takeover data from these two takeover data to use the takeover data.

Further, the takeover data readout unit reads out the takeover data stored in the nonvolatile storage unit into the second data processing unit, when the trouble destroys the takeover data and the processing data stored in the volatile storage unit. Accordingly, the second data processing unit can execute the process by using the takeover data stored in the nonvolatile storage unit.

Besides, the rewriting unit rewrites the takeover data stored in the nonvolatile storage unit into the changed new takeover data stored in the volatile storage unit, when the predetermined time has passed since the changed new takeover data was stored in the volatile storage unit.

Namely, the system can resume the process by using the takeover data stored in the nonvolatile memory unit when the predetermined time has passed, even if the takeover data and the processing data stored in the volatile storage unit were destroyed after the prescribed time has passed. Accordingly, the processing time can be shortened, compared with the case that the rewriting is not executed when the predetermined time has passed.

Further, the rewriting unit rewrites the takeover data stored in the nonvolatile storage unit, when it is determined that predetermined capacity of the changed data was stored in the volatile storage unit. Namely, the system can resume the process by using the takeover data stored in the nonvolatile storage unit when the predetermined capacity has been surpassed, even if the takeover data and the processing data stored in the volatile storage unit were destroyed after the predetermined capacity has been surpassed. Accordingly, the processing time can be shortened compared with the case that the rewriting is not executed when the prescribed time has been surpassed.

Moreover, the volume of the rewriting can be reduced, since the rewriting unit reads only the takeover data corresponding to the tag information of the processing data out of the plural takeover data to rewrite the takeover data stored in the nonvolatile storage unit into the read takeover data.

Besides, the rewriting unit transmits the processing data through the network to other data processing unit and rewrites the takeover data stored in the nonvolatile storage unit into the changed new takeover data stored in the first volatile storage unit.

The rewriting unit takes over the initiation permission message for permitting the other data processing unit to use the processing data to the other data processing unit when the rewriting of the takeover data was ended. Namely, the processing time can be shortened, compared with the case that the processing data is transmitted after the takeover data is reflected, since the transmission of the processing data and the reflection of the takeover data to the nonvolatile storage unit are executed simultaneously.

Besides, the rewriting unit rewrites the takeover data stored in the second volatile storage unit into the takeover data changed by the change unit, only when the demanding unit issued a transmission demand to the second volatile storage unit through the network of the processing data stored in the first volatile storage unit.

For this reason, the frequency of the rewriting is diminished drastically and the processing time can be reduced, compared with the case that the takeover data is rewritten whenever the takeover data is changed.

Further, the rewriting unit transmits the processing data through the network to other data processing unit, and rewrites the takeover data stored in the second volatile storage unit into the changed takeover data stored in the first volatile storage unit at the same time. Then, the rewriting unit takes over the initiation permission message for permitting the other data processing unit of the processing unit to use the processing data to the other data processing unit, when the rewriting of the takeover data was ended.

Namely, the processing time can be shortened, compared with the case that the processing data is transmitted after the takeover data is reflected, since the processing data and the takeover data are transferred simultaneously.

DETAILED DESCRIPTION OF THE PREFERRED EMBODIMENT

Figure 1:
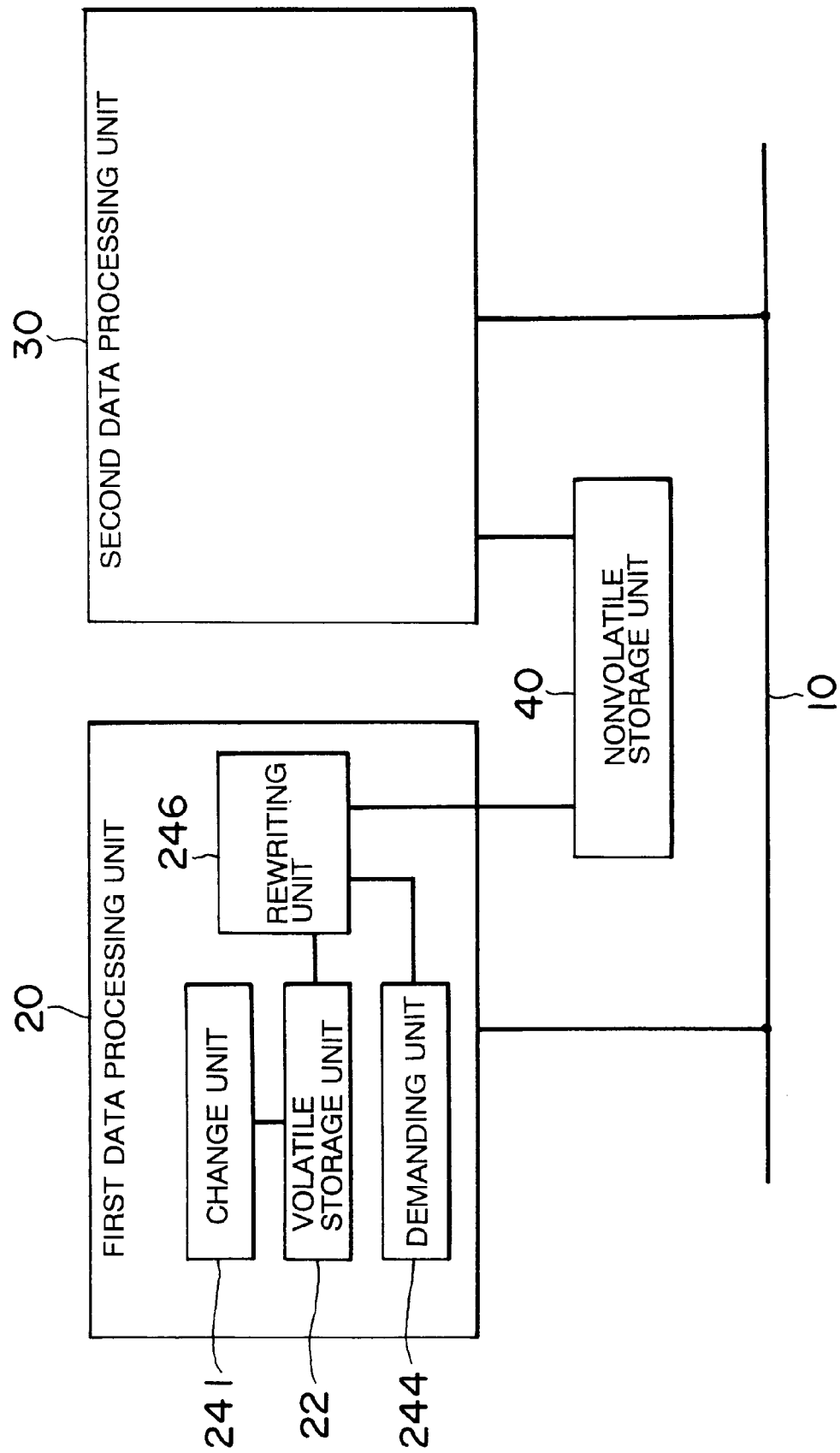
FIG. 1 is a construction block diagram indicating a system for taking over data of an embodiment 1 of the present invention.

The embodiments of the present invention will be described by referring to the drawings as follows. FIG. 1 is a construction block diagram indicating a system for taking over data of the embodiment 1 of the present invention.

Embodiment 1

The system for taking over data comprises a network 10, a first data processing unit 20 connected to the network 10, a second data processing unit 30 connected to the network 10, a nonvolatile storage unit 40 connected to the first data processing unit 20 and the second data processing unit 30.

The first data processing unit 20 processes a processing data following an execution of a program. The second data processing unit 30 takes over a takeover data necessary for resuming a process, when there is some trouble with the first data processing unit.

The first data processing unit 20 comprises a volatile storage unit 22, a change unit 241, a nonvolatile storage unit 40, a demanding unit 244 and a rewriting unit 246. Further, the volatile storage unit 40, the change unit 241, the nonvolatile storage unit 40, the demanding unit 244, the rewriting unit 246 can be provided outside without being provided with the first data processing unit 20 and the second data processing unit 30.

The volatile storage unit 22 stores the takeover data and the processing data. The volatile storage unit 22 is a random access memory whose data disappears when the power supply is cut off and so on.

The change unit 241 is connected to the volatile storage unit 22 and changes the takeover data stored in the volatile storage unit 22 into a new takeover data following the execution of the program by the first data processing unit 20.

The nonvolatile storage unit 40 stores the takeover data. The nonvolatile storage unit 40 is a floppy disk, a hard disk or a magnetic tape whose data does not disappear even if the power supply is cut off and so on.

The demanding unit 244 issues a transmission demand for transmitting the processing data stored in the volatile storage unit 22 to one of the nonvolatile storage unit 40 and the network 10.

The rewriting unit 246 is connected to the volatile storage unit 22, the demanding unit 244 and the nonvolatile storage unit 40. The rewriting unit 246 rewrites the takeover data stored in the nonvolatile storage unit 40 into the new takeover data changed by the change unit 241, when the transmission demand was issued by the demanding unit 244. The rewriting unit 246 transfers the rewritten takeover data to the nonvolatile storage unit 40.

The change unit 241, the demanding unit 244 and the rewriting unit 246 are, for instance, the functions which will be realized if the central processing unit (CPU) execute the program stored in the memory.

Figure 2:
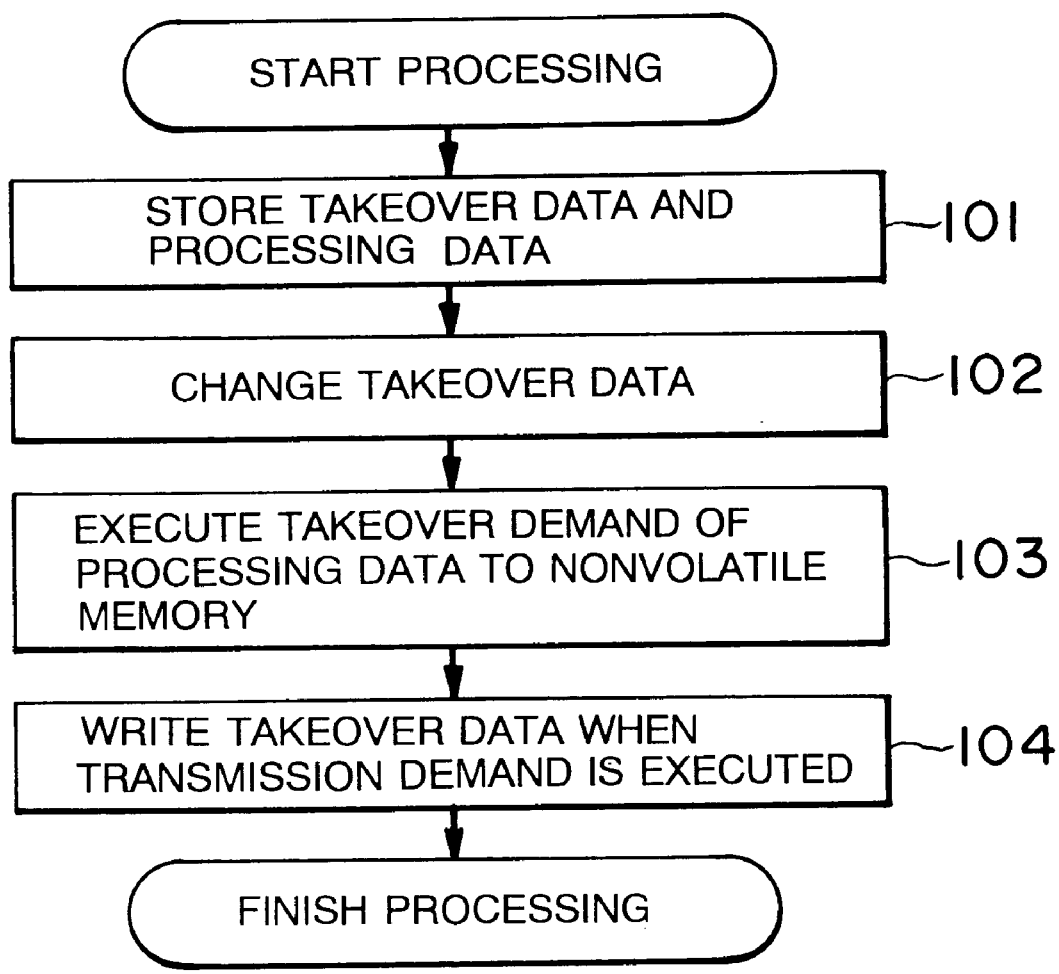
FIG. 2 is a flowchart indicating a method for taking over data of the embodiment 1 of the present invention.

Then, a method for taking over data according to the embodiment 1 constructed in the above-mentioned way will be described by referring to the drawings. FIG. 2 is a flowchart indicating the method for taking over data according to the embodiment 1.

First of all, the volatile storage unit 22 stores a takeover data and a processing data after the first data processing unit 20 processes the processing data following an execution of a program (Step 101).

Besides, the change unit 241 changes the takeover data stored in the volatile storage unit 22 into a new takeover data following the execution of the program (Step 102).

Secondly, the demanding unit 244 issues a transmission demand for transmitting the processing data stored in the volatile storage unit 22 to one of the nonvolatile storage unit 40 and the network 10 (Step 103).

Then, the rewriting unit 246 reads out the new takeover data changed by the change unit 241 from the volatile storage unit 22, when the transmission demand was issued. Then, the rewriting unit 246 rewrites the takeover data which have been already stored in the nonvolatile storage unit 40 into the new takeover data changed by the change unit 241 (Step 104).

Accordingly, the frequency of the rewriting is diminished drastically and the processing time can be reduced, compared with the case the takeover data stored in the nonvolatile storage unit 40 is rewritten whenever the takeover data is changed.

Embodiment 2

Figure 3:
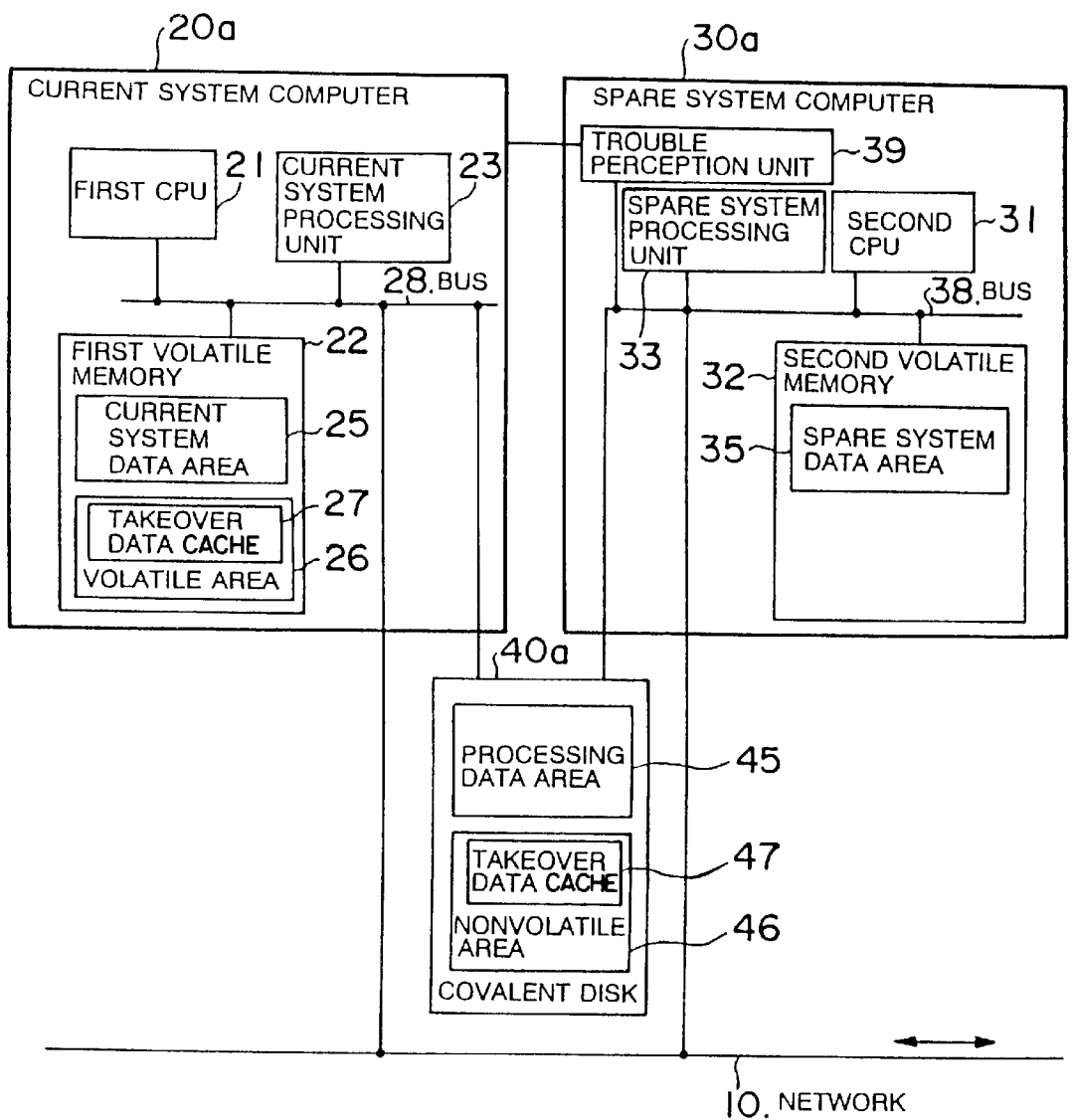
FIG. 3 is a construction block diagram indicating a system for taking over data of an embodiment 2 of the present invention.

FIG. 3 is a construction block diagram indicating a system for taking over data of the embodiment 2 of the present invention. The system for taking over data comprises a network 10, a current system computer 20a and a spare system computer 30a connected to the network 10, and a covalent disk 40a connected to the current system computer 20a and the spare system computer 30a. The embodiment 2 is characterized by the fact that a takeover data cache stored in the current system computer 20a is taken over to the covalent disk 40a.

The current system computer 20a processes a processing data following the execution of the program. The spare system computer 30a operates by taking over a takeover data necessary for resuming the process in place of the current system computer 20a, when there is some trouble with the current system computer 20a.

The current system computer 20a comprises a bus 28, a first CPU 21 connected to the bus 28, a first volatile memory 22 connected to the bus 28 and a current system processing unit 23 connected to the bus 28.

The first volatile memory 22 is, for instance, a random access memory and so on, and is destroyed when the power supply is cut off and there is some trouble with the current system computer 20a.

The first volatile memory comprises a current system data area 25 which stores a processing data to be processed by the first CPU 21 and a volatile area 26 which stores a cache takeover data 27 as mentioned hereinafter.

The current system processing unit 23 processes a processing data and a takeover data, and executes the process by executing the processing program stored in a main memory which is not illustrated by the first CPU 21.

The spare system computer 30a comprises a bus 38, a second CPU 31 connected to the bus 38, a second volatile memory 32 connected to the bus 38, a spare system processing unit 33 connected to the bus 38 and a trouble perception unit 39 connected to the bus 38.

The second volatile memory 32 is, for instance, a random access memory and so on. The second volatile memory 32 includes a spare system data area 35 which stores a processing data to be processed by the second CPU 31.

The spare system processing unit 33 processes a processing data and a takeover data, and executes the process by executing the processing program stored in a main memory which is not illustrated by the second CPU 31.

The trouble perception unit 39 is a sensor and so on, and is connected to the current system computer 20a. The trouble perception unit 39 perceives the trouble when there is some trouble with the current system computer 20a, and outputs a perception signal to the bus 38.

The covalent disk 40a is a nonvolatile memory whose data will not be destroyed even if the power supply is cut off.

The covalent disk 40a is a hard disk, a photo-magnetic-disk or a floppy disk and so on. The covalent disk 40a is connected to the bus 28 of the current system computer 20a and the bus 28 of the spare system computer 30a.

The covalent disk 40a stores the takeover data of the first volatile memory 22 in the nonvolatile area 46, and stores the processing data in the processing data area 45.

Figure 4:
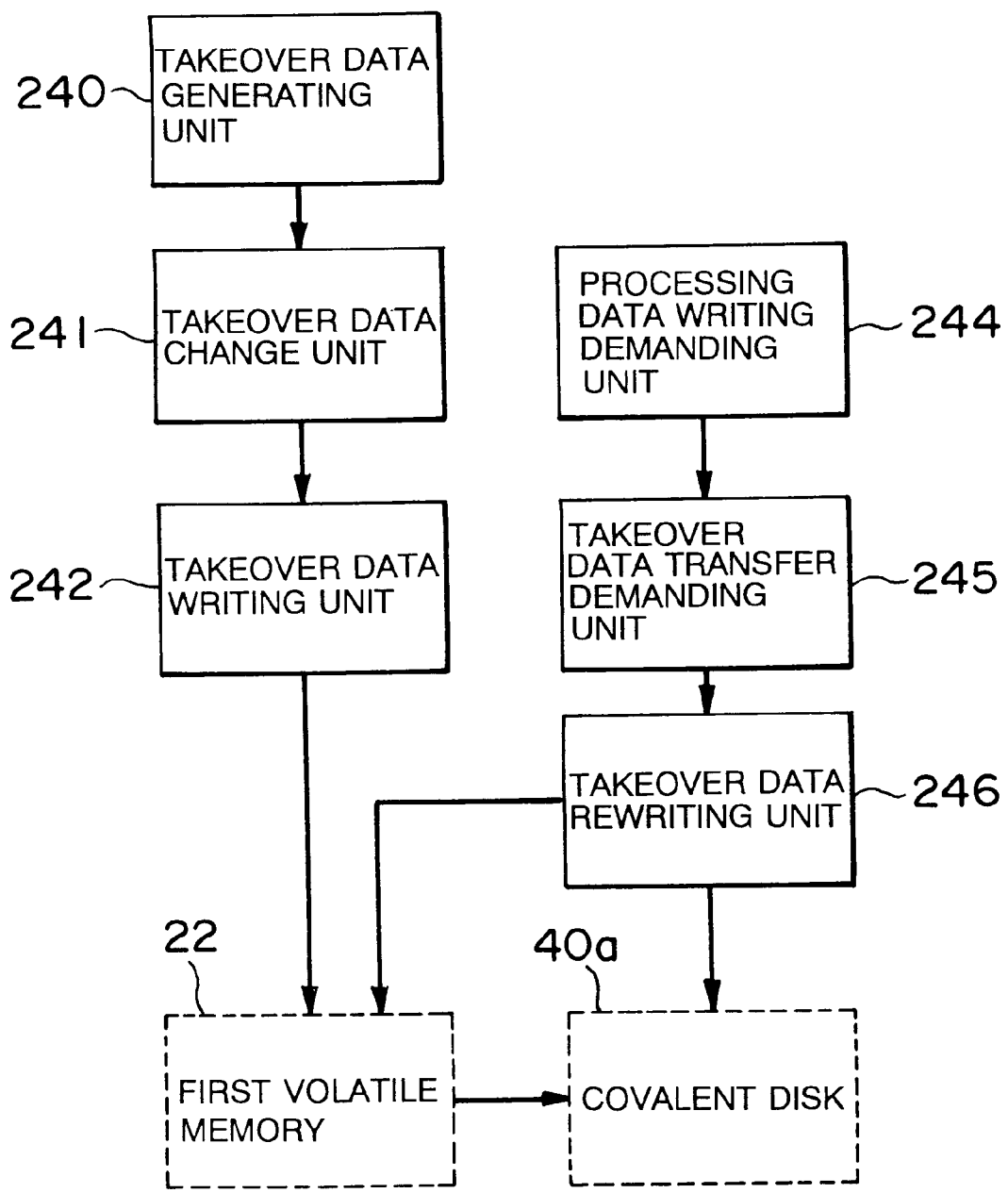
FIG. 4 is a construction block diagram indicating a current system processing unit of the embodiment 2.

FIG. 4 is a construction block diagram indicating a current system processing unit of the embodiment 2. In FIG. 4, the current system processing unit 23 comprises a takeover data generating unit 240, a takeover data change unit 214 connected to the takeover data generating unit 240, a takeover data writing unit 242 connected to the takeover data change unit 241 and the first volatile memory 22 and a processing data writing demanding unit 244.

The current system processing unit 23 comprises a takeover data transfer demanding unit 245 and a takeover data rewriting unit 246 connected to the takeover data transfer demanding unit 245, the covalent disk 40a and the first volatile memory 22.

The takeover data generating unit 240 generates a takeover data following the data processing of the first CPU 21. The takeover data change unit 241 changes the takeover data generated by the takeover data generating unit 240, or executes the addition of the takeover data.

The takeover data writing unit 242 writes the takeover data changed or added by the takeover data change unit 241 into the volatile area 26 of the first volatile memory 22. Hereupon, the takeover data changed or added by the takeover data unit 241 is referred to as takeover data cache.

The processing data writing demanding unit 244 executes a writing demand to the covalent disk 40a of the processing data, and a transmission demand to the network. The takeover data transfer demanding unit 245 demands the cache takeover data stored in the volatile area of the first volatile memory 22 to the covalent disk 40a to transfer into the covalent disk 40a, before executing the writing of the processing data on the basis of the writing demand of the processing data writing demanding unit 244.

The takeover data rewriting unit 246 rewrites the takeover data stored in the covalent disk 40a with the cache takeover data stored in the first volatile memory in accordance with the transfer demand of the takeover data transfer demanding unit 245.

Figure 5:
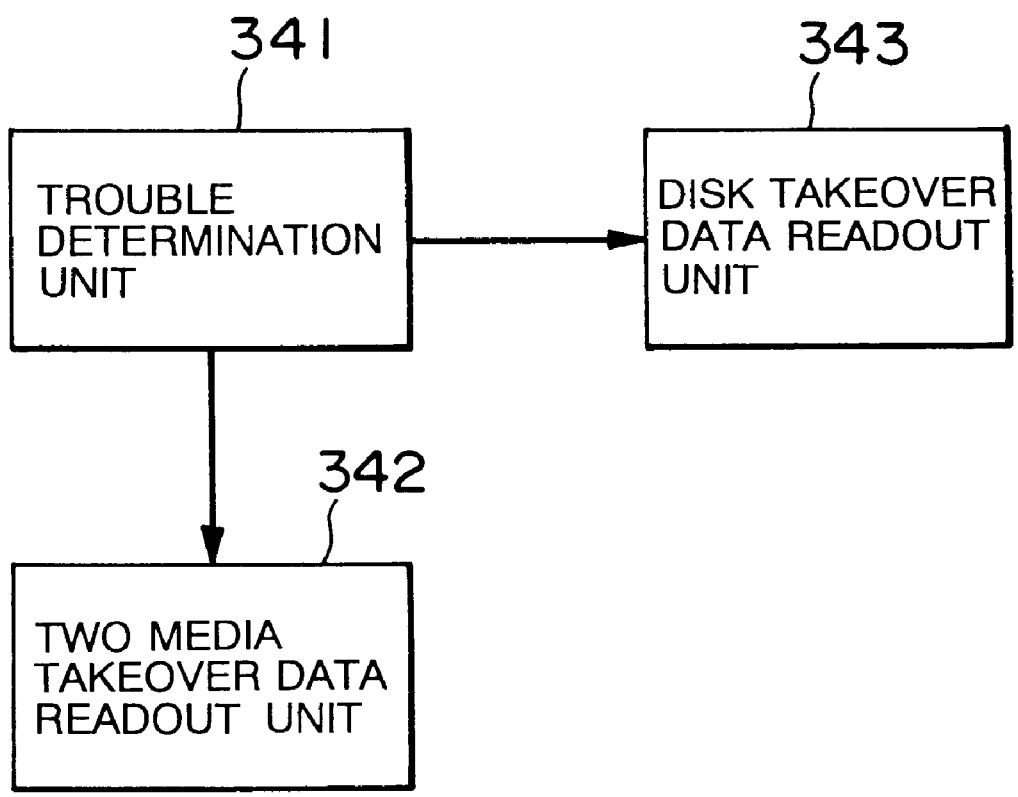
FIG. 5 is a construction block diagram indicating a spare system processing unit of the embodiment 2.

FIG. 5 is a construction block diagram indicating a spare system processing unit of the embodiment 2. In FIG. 5, the spare system processing unit 33 comprises a trouble determination unit 341, a two media takeover data readout unit 342 connected to the trouble determination unit 341 and a disk takeover data readout unit 343 connected to the trouble determination unit 341.

The trouble determination unit 341 determines whether the trouble which occurred in the current system computer 20a destroys the takeover data and the processing data stored in the first volatile memory or not, on the basis of the perception signal outputted from the trouble perception unit 39.

The two media takeover data readout unit 342 reads out the cache takeover data stored in the first volatile memory 22 and the takeover data stored in the covalent disk 40a into the second volatile memory 32 stored in the spare system computer 30a, when the trouble which occurred in the current system computer 20a does not destroy the takeover data and the processing data stored in the first volatile memory 22.

The disk takeover data readout unit 343 reads out only the takeover data within the covalent disk 40a into the second volatile memory 32 within the spare system computer 30a, when the trouble which occurred in the current system computer 20a destroys the takeover data and the processing data stored in the first volatile memory 22.

Figure 6:
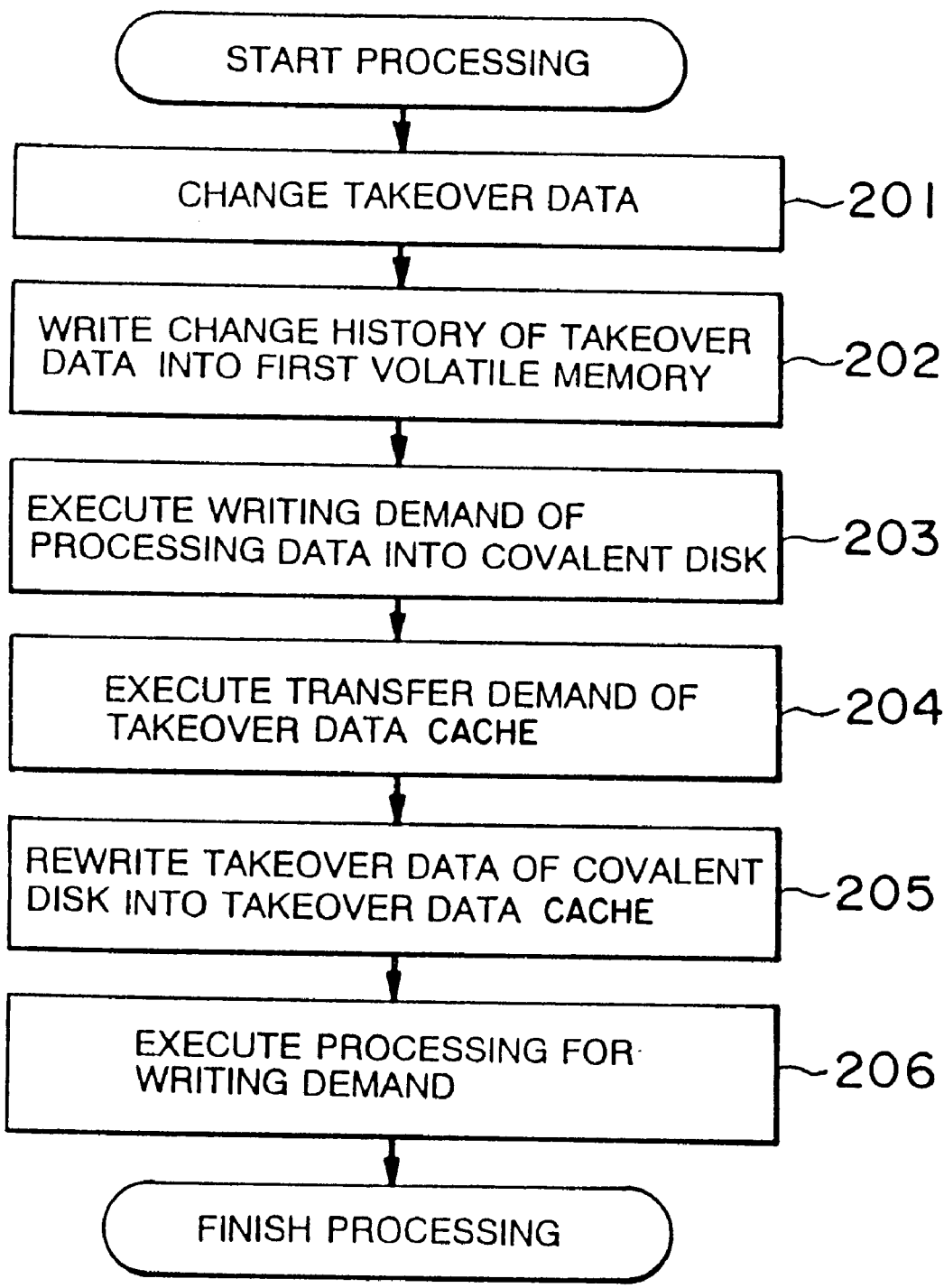
FIG. 6 is a flowchart indicating a method for taking over data in a current system computer of the embodiment 2.

Then, a method for taking over data of the embodiment 2 constructed in the above-mentioned way will be described by referring to the drawings. FIG. 6 is a flowchart indicating the method for taking over data in the current system computer 20a according to the embodiment 2.

First of all, the takeover data change unit 241 executes a change or an addition for the takeover data generated by the takeover data generating unit 240 (Step 201). Then, the cache takeover data 27 changed or added by the takeover data writing unit 242 is written into the volatile area 26 of the first volatile memory 22 (Step 202). Namely, the change history of the takeover data is written into the volatile area 26.

Secondly, the processing data writing demanding unit 244 executes a writing demand into the covalent disk 40a of the processing data (Step 203). Then, the takeover data transfer demanding unit 245 demands a transfer of the cache takeover data stored in the volatile area 26 of the first volatile memory 22 to the volatile disk 40a before the writing of processing data is executed, on the basis of the writing demand of the data writing demanding unit 244 (Step 204).

Then, the takeover data rewriting unit 246 rewrites the takeover data stored in the covalent disk 40a into the cache takeover data 27 stored in the first volatile memory 22 in accordance with the transfer demand of the takeover data transfer demanding unit 245 (Step 205). Further, the writing of the processing data into the covalent disk 40a is executed for writing demand (Step 206).

As mentioned hereinbefore, the takeover data of the nonvolatile area within the covalent disk 40a is rewritten on the basis of the cashed takeover data stored in the first volatile memory 22, only when it is necessary to transmit the processing data to the memories except the first volatile memory 22.

Accordingly, the frequency of the writing can be reduced compared with the traditional case that the takeover data is written into the covalent disk 40a whenever the takeover data is changed. As a result, the processing time of the data can be kept small.

Besides, only the processing of Step 206 should be executed when no change history of the takeover data is stored in the first volatile memory 22, since there is no need to transfer the takeover data cash to the covalent disk 40s.

Figure 7:
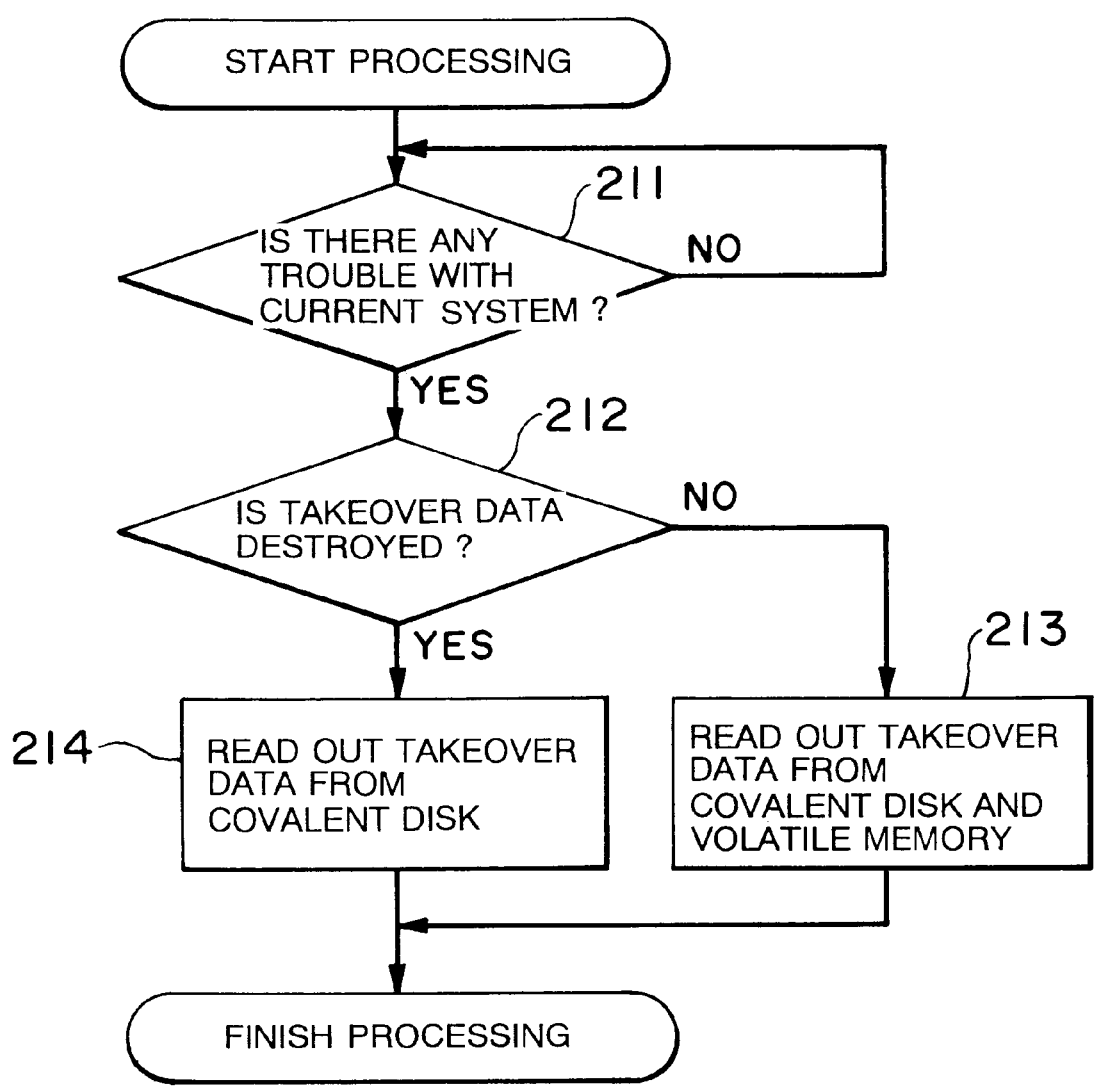
FIG. 7 is a flowchart indicating a method for taking over data in a spare system computer of the embodiment 2.

Then, a method for taking over data in the spare system computer will be described. FIG. 7 is a flowchart indicating the method for taking over data in the spare system processing unit of the embodiment 2.

First of all, the trouble perception unit 39 determines whether there is some trouble with the current system computer 20a or not (Step 211). The trouble perception unit 39 outputs a perception signal, when the current system computer 20a has been stopped due to the trouble which occurred in it.

The trouble determination unit 341 determines whether the trouble which occurred in the current system computer 20a destroys the cashed takeover data and the processing data stored in the first volatile memory 22 or not, on the basis of the perception signal outputted from the trouble perception unit 39 (Step 212).

The two media takeover data readout unit 342 reads out the cashed takeover data stored in the first volatile memory 22 and the takeover data stored in the covalent disk 40a into the second volatile memory 32 stored in the spare system computer 30a, when the trouble which occurred in the current system computer 20a does not destroy the cashed takeover data and the processing data stored in the first volatile memory 22 (Step 213).

Namely, the spare system computer 30a can get a newest takeover data from the cache takeover data stored in the first volatile memory 22 and the takeover data stored in the covalent disk 40a to make use of it.

The disk takeover data readout unit 343 reads out only the takeover data stored in the covalent disk 40a into the second volatile memory 32 stored in the spare system computer 30a, when the trouble which occurred in the current system computer 20a destroys the cashed takeover data and the processing data stored in the first volatile memory 22 (Step 214).

Namely, the newest takeover data exists in the nonvolatile area 46 when the takeover occurred. The takeover data can be taken over to the spare system computer 30a. Then, the spare system computer 30a will start the operation as a current system.

Moreover, if a trouble which is serious enough to destroy the cashed takeover data and the processing data stored in the volatile memory occurs after a while the takeover data has been taken over to the covalent disk 40a. The result will be the same as the case that the current system computer 20a went wrong just after the takeover data has been taken over to the covalent disk 40a for the last time. Namely, the processing should be executed by returning the processing to the last takeover data, since the last takeover data is used.

Besides, it sometimes happens that the data whose influence is small will be transferred, even if the data is transferred to the outside of the first volatile memory 22 and there is some trouble with the current system computer 20a. For instance, the log writing into the terminal unit is not regarded as a data transfer to the outside of the first volatile memory 22. Accordingly, in this case, the rewriting of the takeover data should not be executed. Hereupon, the log writing means the writing of the changed history data.

Embodiment 3

Figure 8:
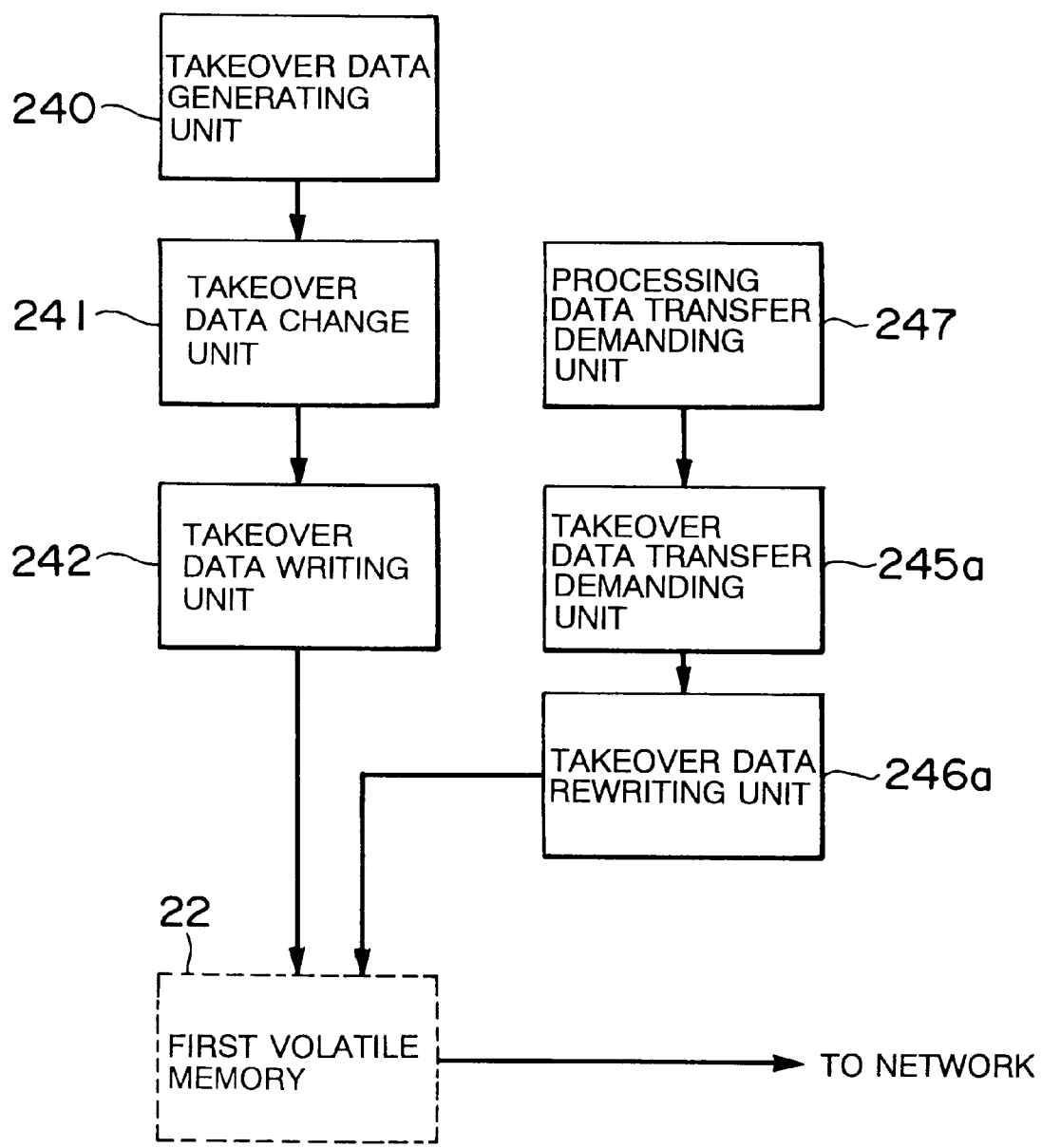
FIG. 8 is a construction block diagram indicating a current system processing unit of an embodiment 3.

Then, the embodiment 3 of the present invention will be described. FIG. 8 is a construction block diagram indicating a current system processing unit in the embodiment 3 of the present invention. In the embodiment 3, the construction of the current system processing unit is different from the construction of the embodiment 2. Hereupon, only the construction of the current system processing unit will be described. The embodiment 3 is characterized by the fact that the cashed takeover data stored in the current system computer 20a is taken over to the spare system computer 30a directly.

As shown in FIG. 8, the current system processing unit comprises a processing data transfer demanding unit 247, a takeover data transfer demanding unit 245a connected to the processing data transfer demanding unit 247 and a takeover data rewriting unit 246a connected to the takeover data transfer demanding unit 245a and the first volatile memory 22.

Further, the constructions of the takeover data generating unit 240, the takeover data changing unit 214 and the takeover data writing unit 242 are the same as the corresponding parts of the embodiment 2.

The processing data transfer demanding unit 247 executes a transmission demand of the processing data to the spare system computer 30a through the network 10. The takeover data transfer demanding unit 245a demands a transfer of the cashed takeover data stored in the volatile area of the first volatile memory 22 to the network 10, before transferring the processing data on the basis of the transfer demand of the processing data transfer demanding unit 247.

The takeover data rewriting unit 246a rewrites the takeover data stored in the second volatile memory 32 into the cashed takeover data stored in the first volatile memory 22 in accordance with the transfer demand of the takeover data transfer demanding unit 245a.

Figure 9:
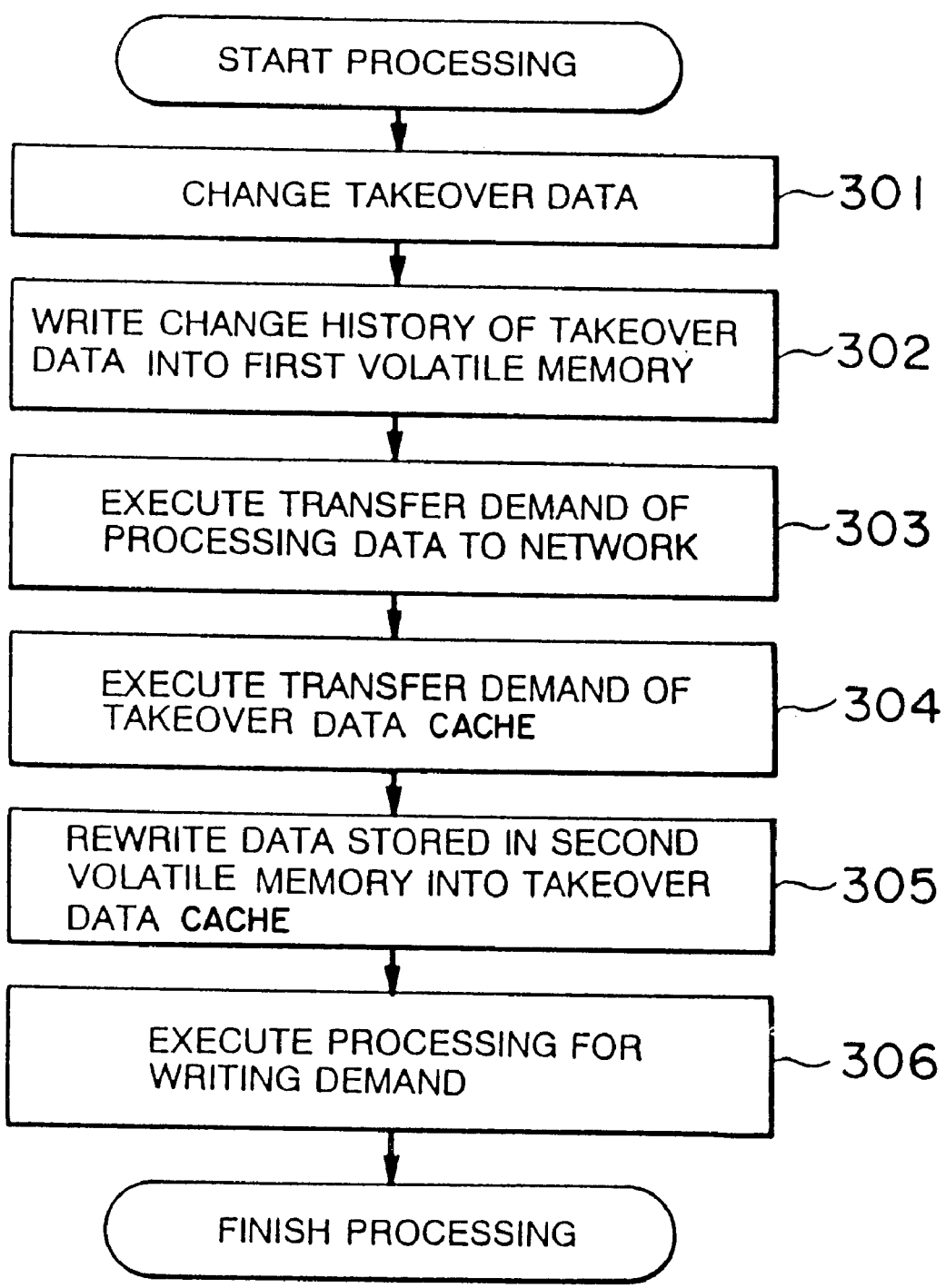
FIG. 9 is a flowchart indicating a method for taking over data in a current system computer of the embodiment 3.

FIG. 9 is a flowchart indicating a method for taking over data in the current system computer of the embodiment 3.

First of all, the takeover data change unit 241 executes a change or an addition for the takeover data generated by the takeover data generating unit 240 (Step 301). Then, the takeover data changed or added by the takeover data writing unit 242 is written into the volatile area 26 of the volatile memory 22 (Step 302). Namely, the change history of the takeover data will be written into the volatile area.

Secondly, the processing data transfer demanding unit 247 executes a transfer demand of the processing data to the network 10 (Step 303). Then, the takeover data transfer demanding unit 245a demands a transmission of the takeover data stored in the volatile area 26 of the first volatile memory 22 to the network 10, before transferring the processing data on the basis of the transfer demand of the processing data transfer demanding unit 247 (Step 304).

Then, the takeover data rewriting unit 246a rewrites the data stored in the second volatile memory 32 into the cashed takeover data 27 stored in the volatile memory 22 in accordance with the transfer demand of the takeover data transfer demanding unit 245a (Step 305). Further, the takeover data rewriting unit 246a executes a transfer processing of the processing data to the network 10 for the transfer demand (Step 306).

Hereupon, the second volatile memory 32 can be regarded as a nonvolatile memory as seen by the current system computer 20a, when there is some trouble with the current system computer 20a.

As mentioned hereinbefore, the takeover data stored in the second volatile memory 32 should be rewritten on the basis of the takeover data stored in the first volatile memory 22, only when it is necessary to transmit a processing data to the memories except the first volatile memory 22.

Accordingly, the frequency of the writing can be reduced, compared with the traditional case that the takeover data is written whenever the takeover data is changed. As a result, the processing time of the data can be kept small.

Further, in this case, the process in which the takeover data is read out from the covalent disk 40a as the embodiment 2 will be unnecessary, since the cashed takeover data is transferred to the spare system computer 30a directly. Accordingly, the processing time for the takeover data can be further shortened than the embodiment 2.

Embodiment 4

Figure 10:
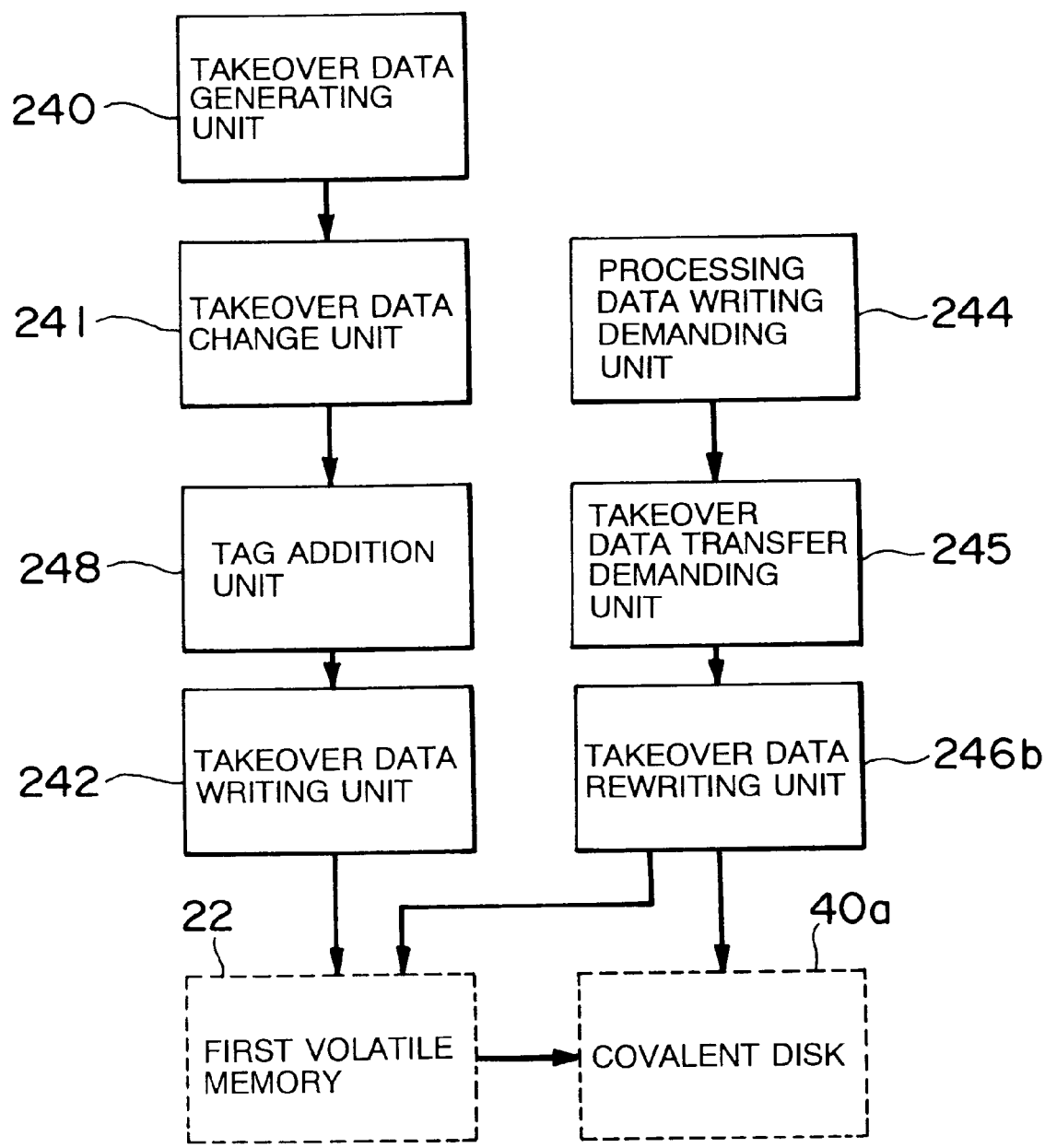
FIG. 10 is a construction block diagram indicating a current system processing unit of an embodiment 4 of the present invention.

Then, the embodiment 4 of the present invention will be described. FIG. 10 is a construction block diagram indicating a current system processing unit of the embodiment 4 of the present invention. In the embodiment 4, the construction of the current system processing unit is different from the construction of the embodiment 2. Hereupon, only the construction of the current system processing unit will be described.

The current system processing unit comprises a takeover data generating unit 240, a takeover data change unit 241 connected to the takeover data generating unit 240, a tag addition unit 248 connected to the takeover data change unit 241, a takeover data writing unit 242 connected to the tag addition unit 248 and the first volatile memory 22 and a processing data writing demanding unit 244.

The current system processing unit comprises a takeover data transfer demanding unit 245 connected to the processing data writing demanding unit 244 and a takeover data rewriting unit 246b connected to the takeover data transfer demanding unit 245, the covalent disk 40a and the first volatile memory 22.

The tag addition unit 248 adds a tag information to each of a plurality of takeover data in order to classify each of the plurality of takeover data in accordance with a kind of the processing data.

Figure 11:
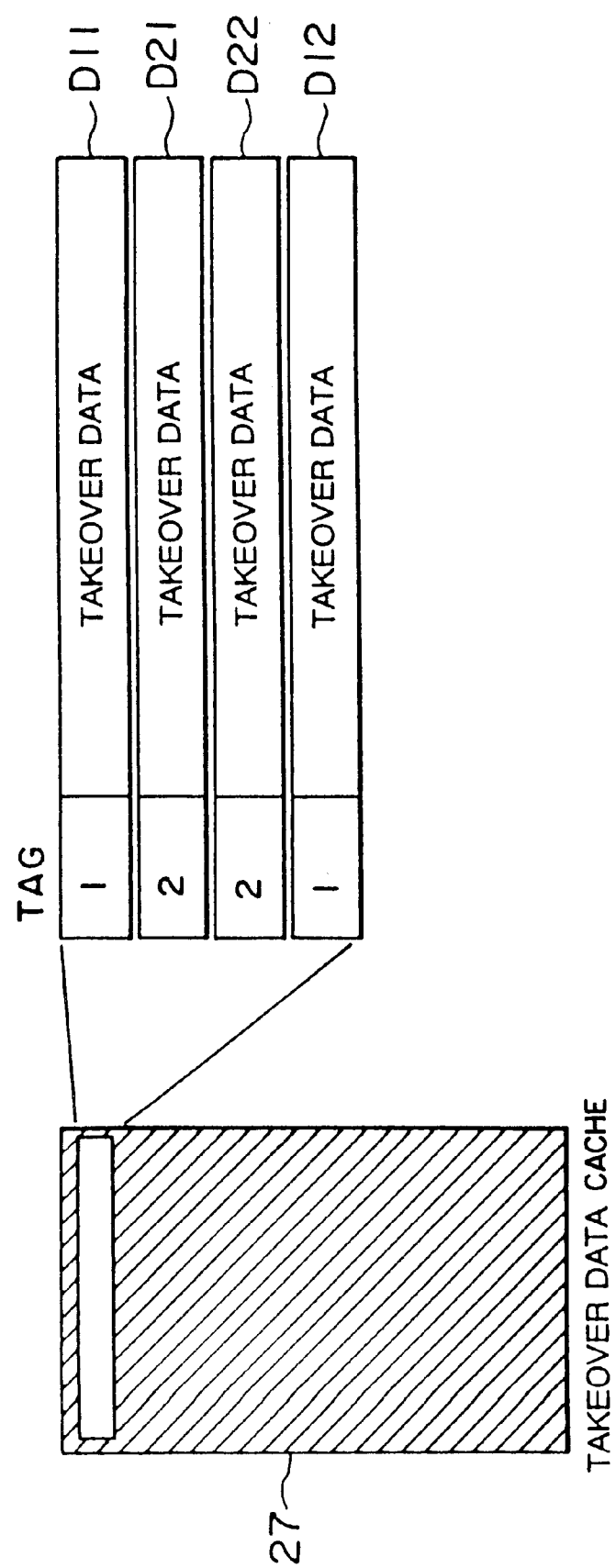
FIG. 11 is a diagram indicating a example in which each of plural takeover data is classified according to a tag information.

In the example shown in FIG. 11, the cashed takeover data comprises a takeover data D11–D1n corresponding to the processing data to be processed by the first CPU 21 and a takeover data D21–D2n corresponding to the processing data to be processed by the second CPU 31. The takeover data D11–D12 and the takeover data D21–D22 as a part of the takeover data cash are shown in FIG. 11.

The tag information '1' is added to the takeover data D11–D1n corresponding to the processing data to be processed by the first CPU 21. The tag information '2' is added to the takeover data D21–D2n corresponding to the processing data to be processed by the second CPU 31.

Besides, the takeover data rewriting unit 246b reads only the takeover data corresponding to the tag information of the processing data out of the cashed takeover data 27 to rewrite the takeover data of the nonvolatile area of the covalent disk 40a into that takeover data.

Figure 12:
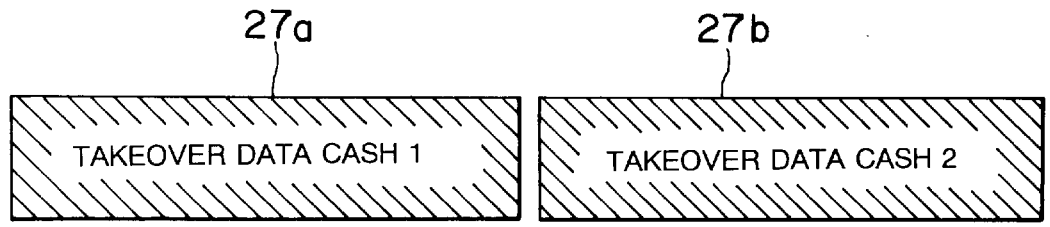
FIG. 12 is a diagram indicating an example in which a plurality of takeover data are classified according to a kind of processing data.

Further, as shown in FIG. 12, the cashed takeover data can be classified into the cashed takeover data 27a corresponding to the processing data to be processed by the first CPU 21 and the cashed takeover data 27b corresponding to the processing data to be processed by the second CPU 31.

Besides, other constructions are the same as the constructions of the embodiment 2, so the identical parts will be described by adding the identical codes to them.

In the above-mentioned construction, the processing data will have to be transmitted to the covalent disk 40a or the network 10. At this moment, the takeover data writing unit 246b will read only the takeover data corresponding to the tag information of the processing data to be transmitted out of the cashed takeover data 27 to rewrite the takeover data of the nonvolatile area of the covalent disk 40a into the read takeover data, since each of the plural takeover data is classified by the tag information previously.

By these actions, the rewriting volume of the nonvolatile area 46 of the covalent disk 40a can be reduced, since only the takeover data of the changed parts is rewritten. Accordingly, further, the accelerating of the system can be planed.

Embodiment 5

Figure 13:
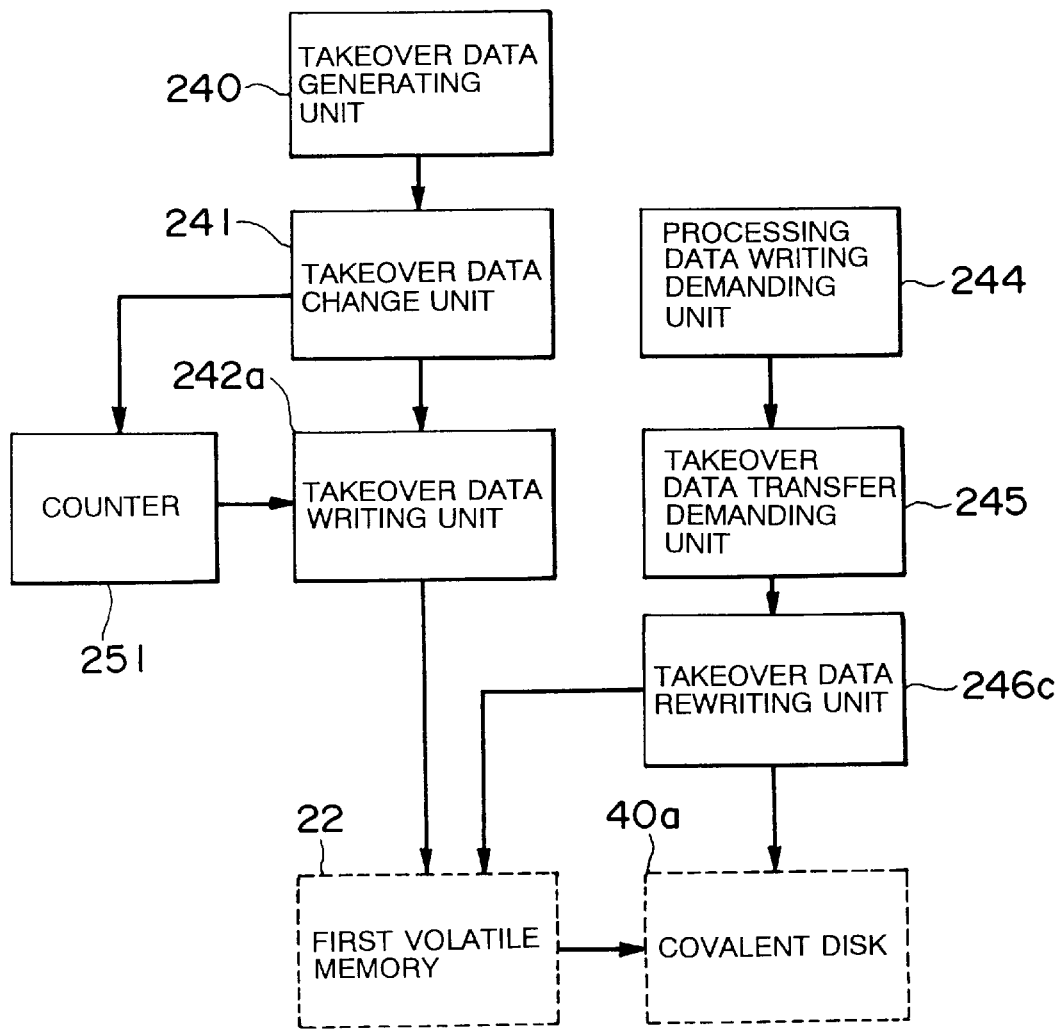
FIG. 13 is a construction block diagram indicating a current system processing unit of an embodiment 5 of the present invention.

Then, the embodiment 5 of the present invention will be described. FIG. 13 is a construction block diagram indicating a current system processing unit of the embodiment 5 of the present invention. In the embodiment 5, the processing will be returned accordingly when the trouble which is serious enough to destroy the takeover data and the processing data stored in the first volatile memory 22 occurs, if the data has been stored in the cashed takeover data for a long time.

The current system processing unit comprises a takeover data generating unit 240, a takeover data change unit 241 connected to the takeover data generating unit 240, a counter 251 connected to the takeover data change unit 241, a takeover data writing unit 242a connected to the takeover data change unit 241, the counter 251 and the first volatile memory 22 and a processing data writing unit 244.

The current system processing unit comprises a takeover data transfer demanding unit 245 connected to the processing data writing demanding unit 244 and a takeover data rewriting unit 246c connected to the takeover data transfer demanding unit 245, the covalent disk 40a and the first volatile memory 22.

The counter 251 counts the predetermined time from a time that the takeover data changed by the takeover data change unit 241 was stored in the first volatile memory 22.

The takeover data rewriting unit 246c rewrites the takeover data stored in the covalent disk 40a into the cashed takeover data stored in the first volatile memory 22, when the predetermined time was counted by the counter 251. Other constructions are the same as the constructions of the embodiment 2.

Figure 14:
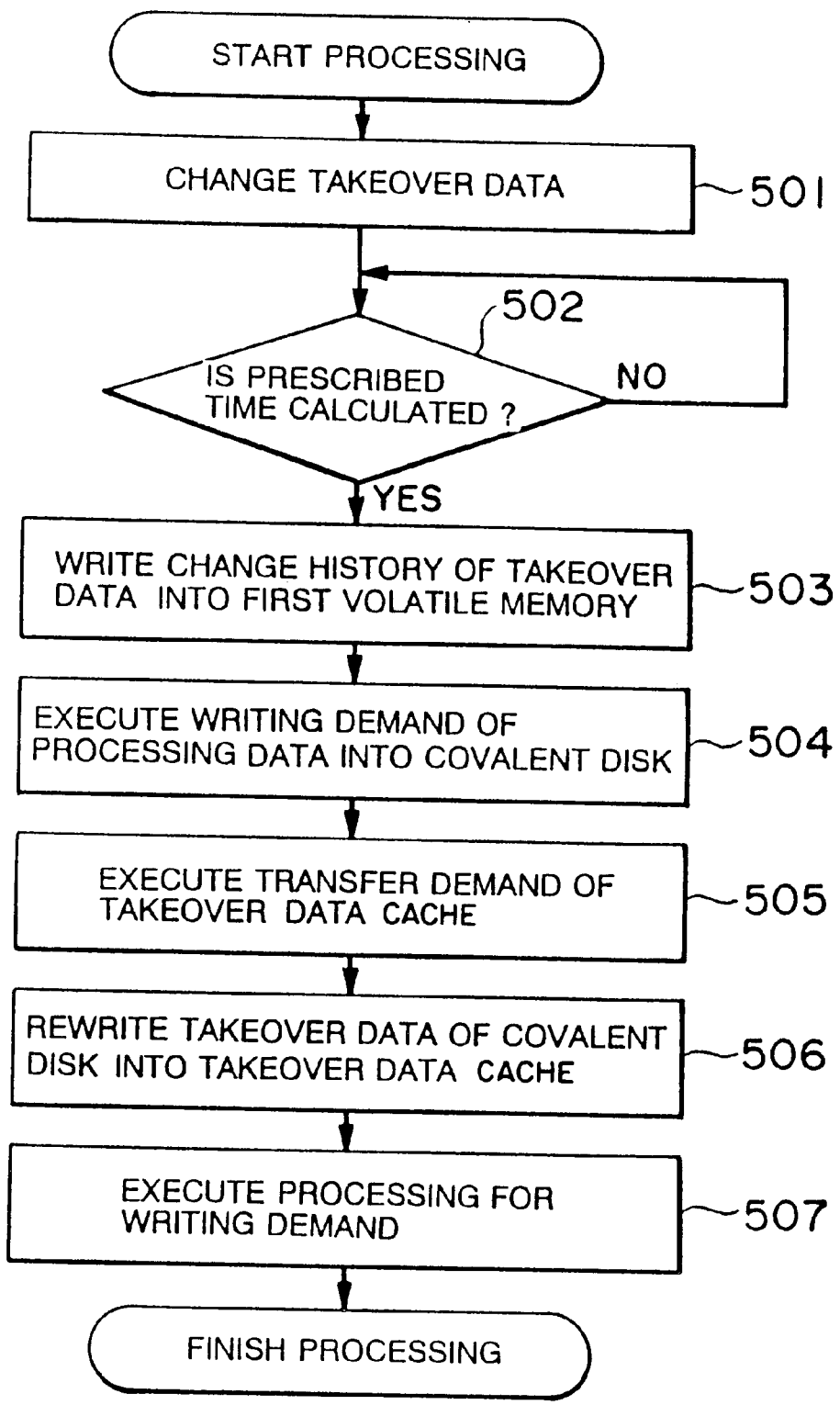
FIG. 14 is a flowchart indicating a method for taking over data in a current system computer of the embodiment 5.

Then, a method for taking over data of the embodiment 5 constructed in the above-mentioned way will be described by referring to the drawings. FIG. 14 is a flowchart indicating the method for transferring data of the embodiment 5.

First of all, the takeover data change unit 241 executes a change or an addition for the takeover data generated by the takeover data generating unit 240 (Step 501).

The counter 251 counts the time from a time that the takeover data changed by the takeover data change unit 241 was stored in the first volatile memory 22. Then, the counter 251 determines whether the counted time has reached the predetermined time or not (Step 502).

The process goes to the process of Step 503 when the counted time has reached the predetermined time. The cashed takeover data 27 changed or added by the takeover data writing unit 242 is written into the volatile area 26 of the first volatile memory 22 (Step 503). Namely, the change history of the takeover data is written into the volatile area 26.

Secondly, the processing data writing demanding unit 244 executes a writing demand of the processing data into the covalent disk 40a (Step 504). Then, the takeover data transfer demanding unit 245 demands a transfer of the cashed takeover data stored in the volatile area 26 of the first volatile memory 22 to the covalent disk 40a, before executing the writing of the processing data on the basis of the writing demand of the data writing demanding unit 244 (Step 505).

Then, the takeover data rewriting unit 246c rewrites the takeover data stored in the covalent disk 40a into the cashed takeover data stored in the first volatile memory 22 in accordance with the transfer demand of the takeover data transfer demanding unit 245, when the predetermined time was counted by the counter 251 (Step 506). Further, the writing of the processing data into the covalent disk 40a for the writing demand is executed (Step 507).

According to the above-mentioned construction, the operations to be executed for the second time will be reduced even if the trouble which is serious enough to destroy the contents of the first volatile memory 22 occurs, since the takeover data of the covalent disk 40a can be rewritten per predetermined time. Accordingly, the accelerating of the re-execution process can be planed, since the operation time is shortened.

Embodiment 6

Figure 15:
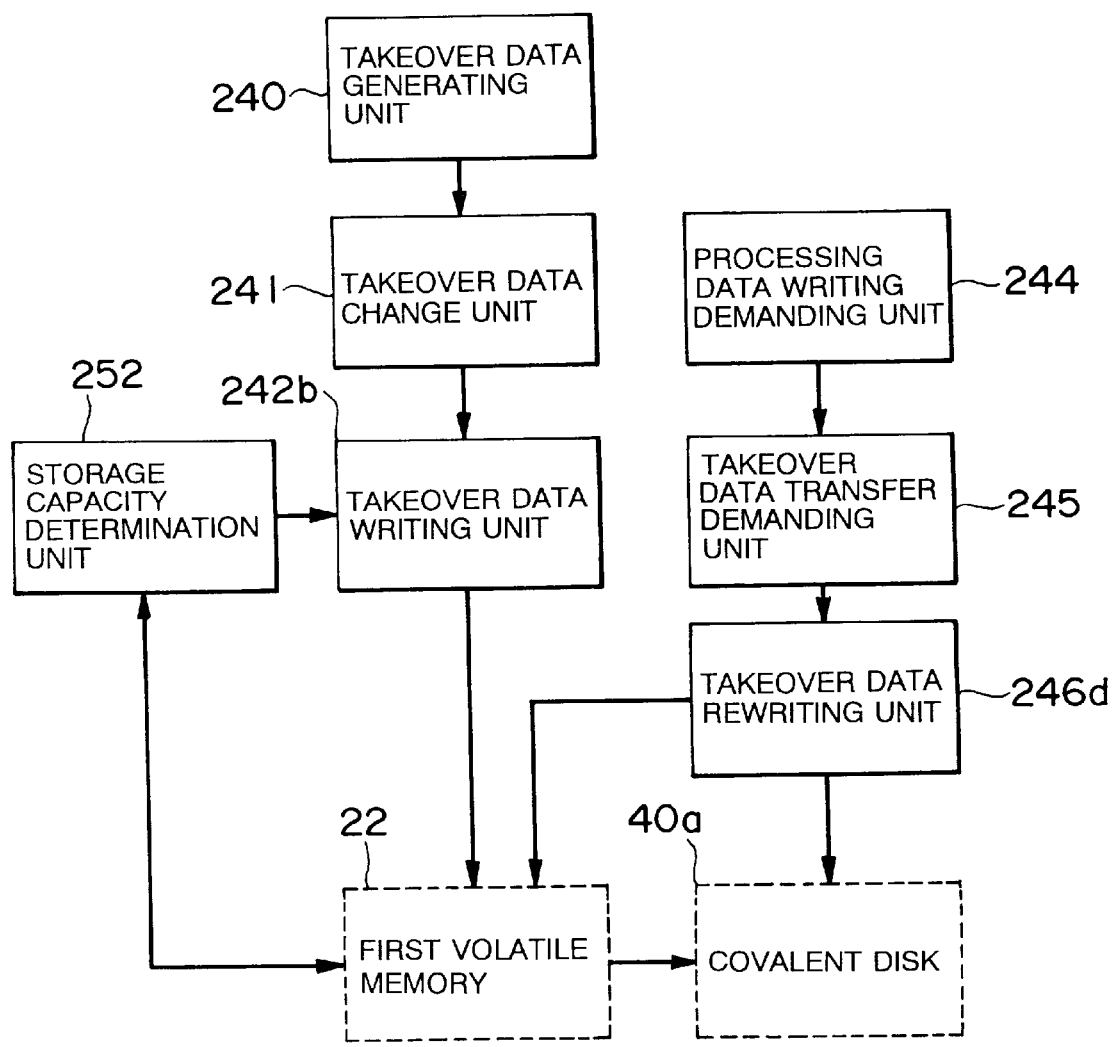
FIG. 15 is a construction block diagram indicating a current system processing unit of an embodiment 6 of the present invention.

Then, the embodiment 6 of the present invention will be described. FIG. 15 is a construction block diagram indicating a current system processing unit of the embodiment 6 of the present invention. The embodiment 6 attains the same object as the object of the embodiment 5.

The current system processing unit comprises a takeover data generating unit 240, a takeover data change unit 241 connected to the takeover data generating unit 240, a storage capacity determination unit 252 connected to the first volatile memory 22, a takeover data writing unit 242b connected to the takeover data change unit 241, the storage capacity determination unit 252 and the first volatile memory 22 and a processing data writing demanding unit 244.

The current system processing unit comprises a takeover data transfer demanding unit 245 connected to the processing data writing demanding unit 244 and a takeover data rewriting unit 246b connected to the takeover data transfer demanding unit 245, covalent disk 40a and the first volatile memory 22.

The storage capacity determination unit 252 determines whether the predetermined capacity of the takeover data changed by the takeover data change unit 241 was stored in the volatile memory 22 or not.

The takeover data rewriting unit 246d rewrites the takeover data stored in the covalent disk 40a, when it is determined by the storage capacity determination unit 252 that the predetermined capacity of the changed data was stored in the volatile memory 22.

Figure 16:
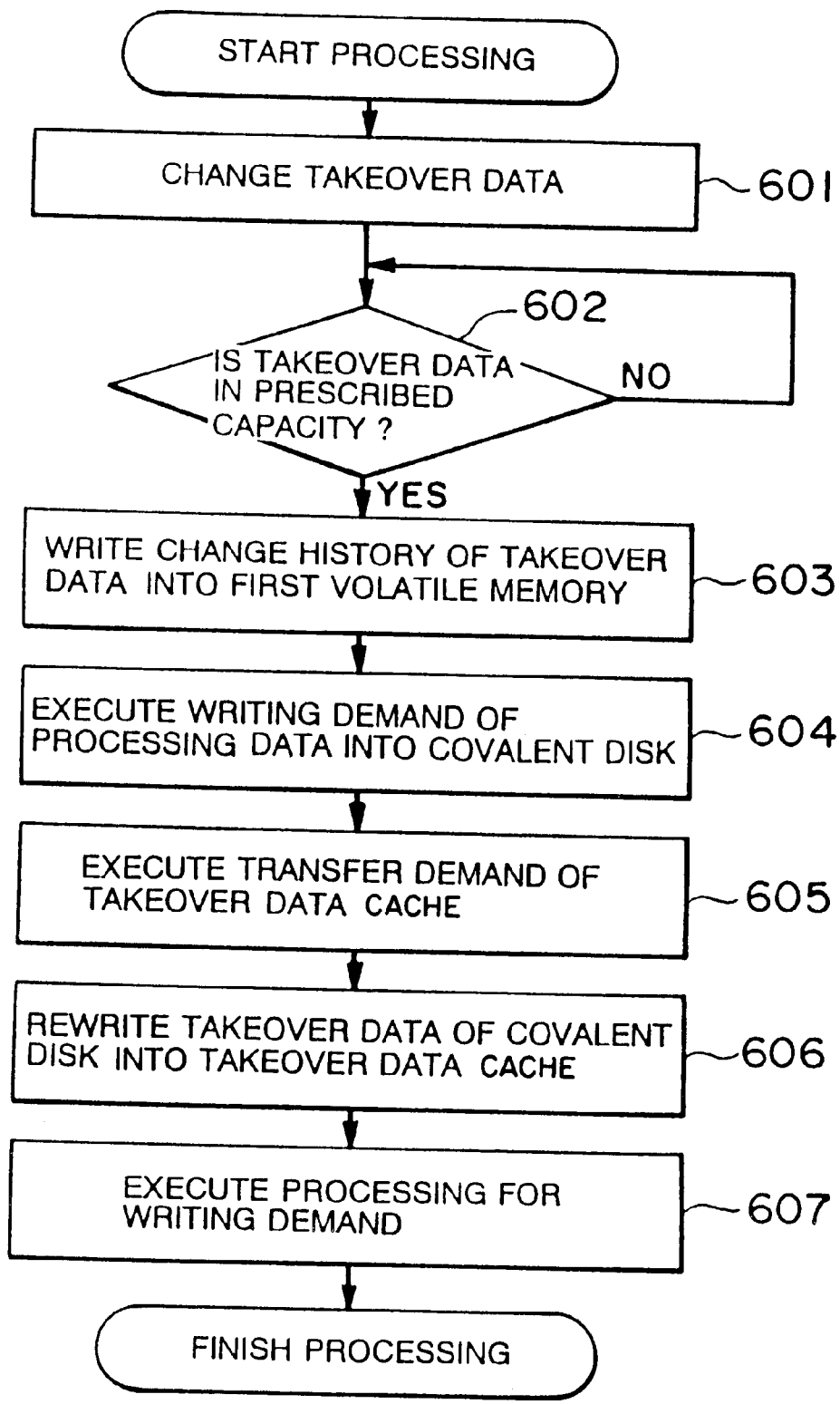
FIG. 16 is a flowchart indicating a method for taking over data in a current system computer of the embodiment 6.

Then, a method for taking over data of the embodiment 6 constructed in the above-mentioned way will be described by referring to the drawings. FIG. 16 is a flowchart indicating the method for taking over data of the embodiment 6.

First of all, the takeover data change unit 241 executes a change or an addition for the takeover data generated in the takeover data generating unit 240 (Step 601).

Then, the storage capacity determination unit 252 determines whether the predetermined capacity of the takeover data changed by the takeover data change unit 241 was stored in the volatile memory 22 or not (Step 602).

The process goes to the process of Step 603, when the predetermined capacity of the changed takeover data was stored in the volatile memory 22. Besides, the processes from Step 603 to Step 607 are the same as the processes from Step 503 to Step 507 of the above-mentioned embodiment 5, so the prescription about them will be omitted.

According to the above-mentioned construction, the operations to be executed for the second time will be reduced even if the trouble which is serious enough to destroy the takeover data and the processing data stored in the first volatile memory 22 occurs, since the takeover data of the nonvolatile area should be rewritten when the cashed takeover data exceeded the predetermined capacity. Accordingly, the accelerating of the re-execution process can be planed, since the operation time is shortened.

Embodiment 7

Figure 17:
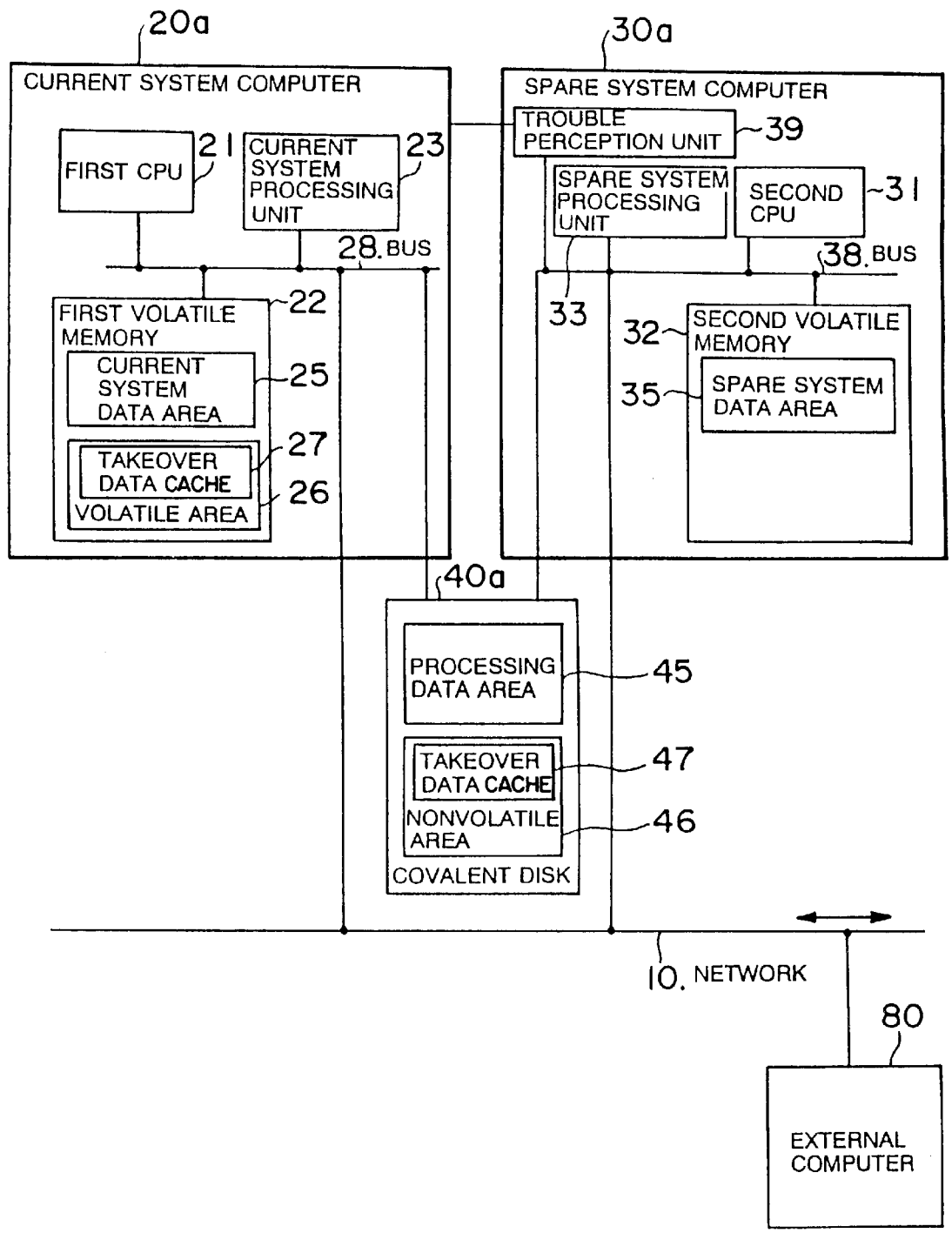
FIG. 17 is a construction block diagram indicating a system for taking over data of an embodiment 7 of the present invention.

Then, the embodiment 7 of the present invention will be described. FIG. 17 is a construction block diagram indicating a system for taking over data of the embodiment 7 of the present invention. In FIG. 17, an external computer 80 as a third computer is connected to the network 10.

Figure 18:
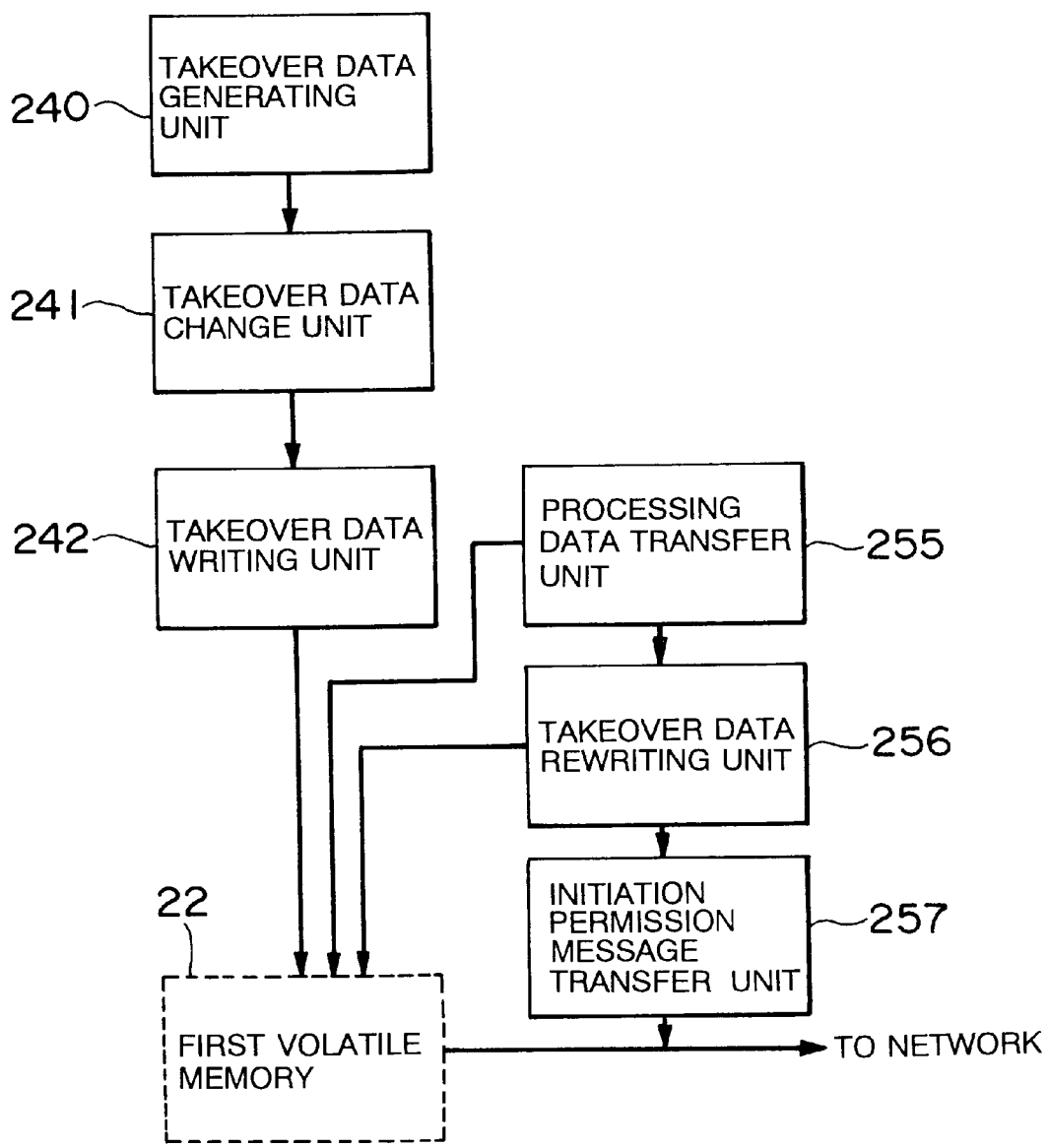
FIG. 18 is a construction block diagram indicating a current system processing unit of the embodiment 7 of the present invention.

FIG. 18 is a construction block diagram indicating a current system processing unit of the embodiment 7 of the present invention. In the embodiment 7, the current system processing unit comprises a takeover data generating unit 240, a takeover data change unit 241 connected to the takeover data generating unit 240 and a takeover data writing unit 242 connected to the takeover data change unit 241.

Further, the current system processing unit comprises a processing data transfer unit 255, a takeover data rewriting unit 256 connected to the processing data transfer unit 255 and an initiation permission message transfer unit 257 connected to the takeover data rewriting unit 256.

The processing data transfer unit 255 takes over a processing data from the first volatile memory 22 through the network to the external computer 80. Simultaneously with the transmission of the processing data, the takeover data rewriting unit 256 rewrites the takeover data stored in the spare system computer 30a into the takeover data stored in the first volatile memory 22.

The initiation permission message transfer unit 257 takes over an initiation permission message for permitting the computer 80 to use the processing data to the computer 80, when the rewriting of the takeover data by the takeover data rewriting unit 256 was ended.

Figure 19:
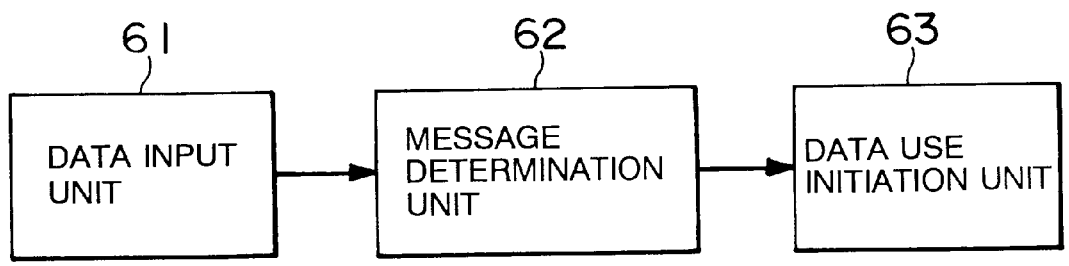
FIG. 19 is a construction block diagram indicating an external computer of the embodiment 7 of the present invention.

FIG. 19 is a construction block diagram indicating the computer 80 of the embodiment 7. In FIG. 19, the computer 80 comprises a data input unit 61, a message determination unit 62 connected to the data input unit 61 and a data use initiation unit 63 connected to the message determination unit 62.

The data input unit 61 receives the processing data and the initiation permission message from the current system computer 20a. The message determination unit 62 determines whether the initiation permission message was received from the current system computer 20a or not.

The data use initiation unit 63 starts using the processing data and the takeover data from a time that the initiation permission message was received, when the initiation permission message was received from the current system computer 20a.

Figure 20:
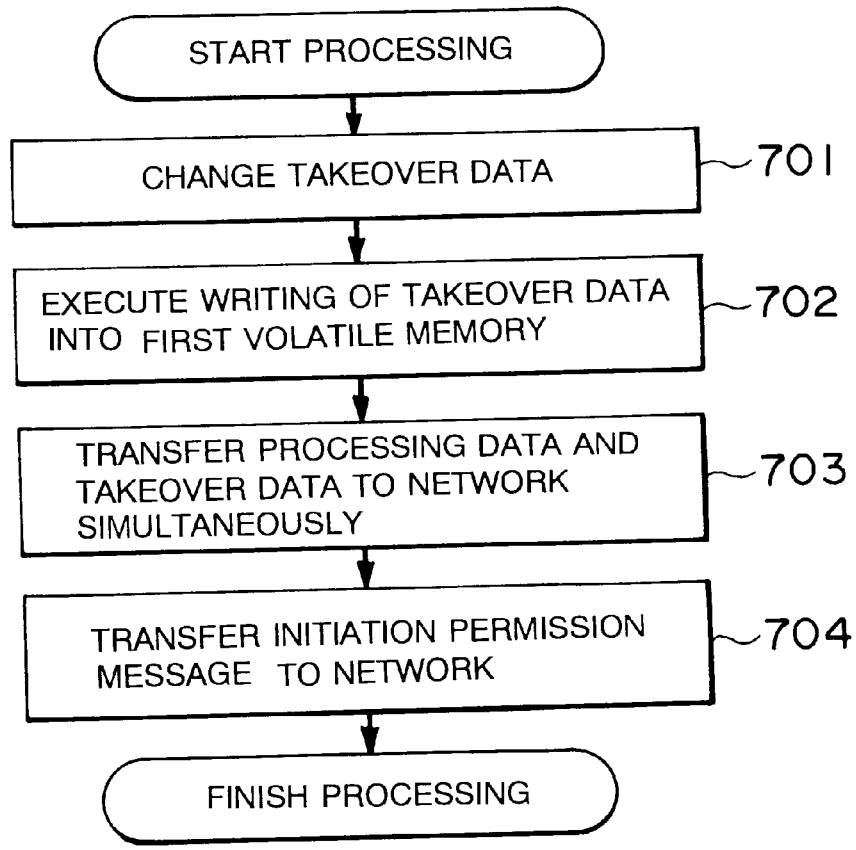
FIG. 20 is a flowchart indicating a method for taking over data of the embodiment 7.

Then, a method for taking over data according to the embodiment 7 of the present invention will be described. FIG. 20 is a flowchart indicating the method for taking over data of the embodiment 7. First of all, the takeover data change unit 241 executes a change or an addition for the takeover data generated by the takeover data generating unit 240 (Step 701).

Then, the cashed takeover data changed or added by the takeover data writing unit 242 is written into the volatile area 26 of the volatile memory 22 (Step 702). Namely, the change history of the takeover data is written into the volatile area.

Then, the processing data transfer unit 255 transfers a processing data from the first volatile memory 22 through the network 10 to the computer 80. Besides, simultaneously with the transmission of the processing data, the takeover data rewriting unit 256 rewrites the takeover data stored in the spare system computer 30a into the takeover data stored in the first volatile memory 22 (Step 703).

Then, the initiation permission message transfer unit 257 takes over the initiation permission message to the computer 80, when the rewriting of the takeover data by the takeover data rewriting unit 256 was ended (Step 704).

Figure 21:
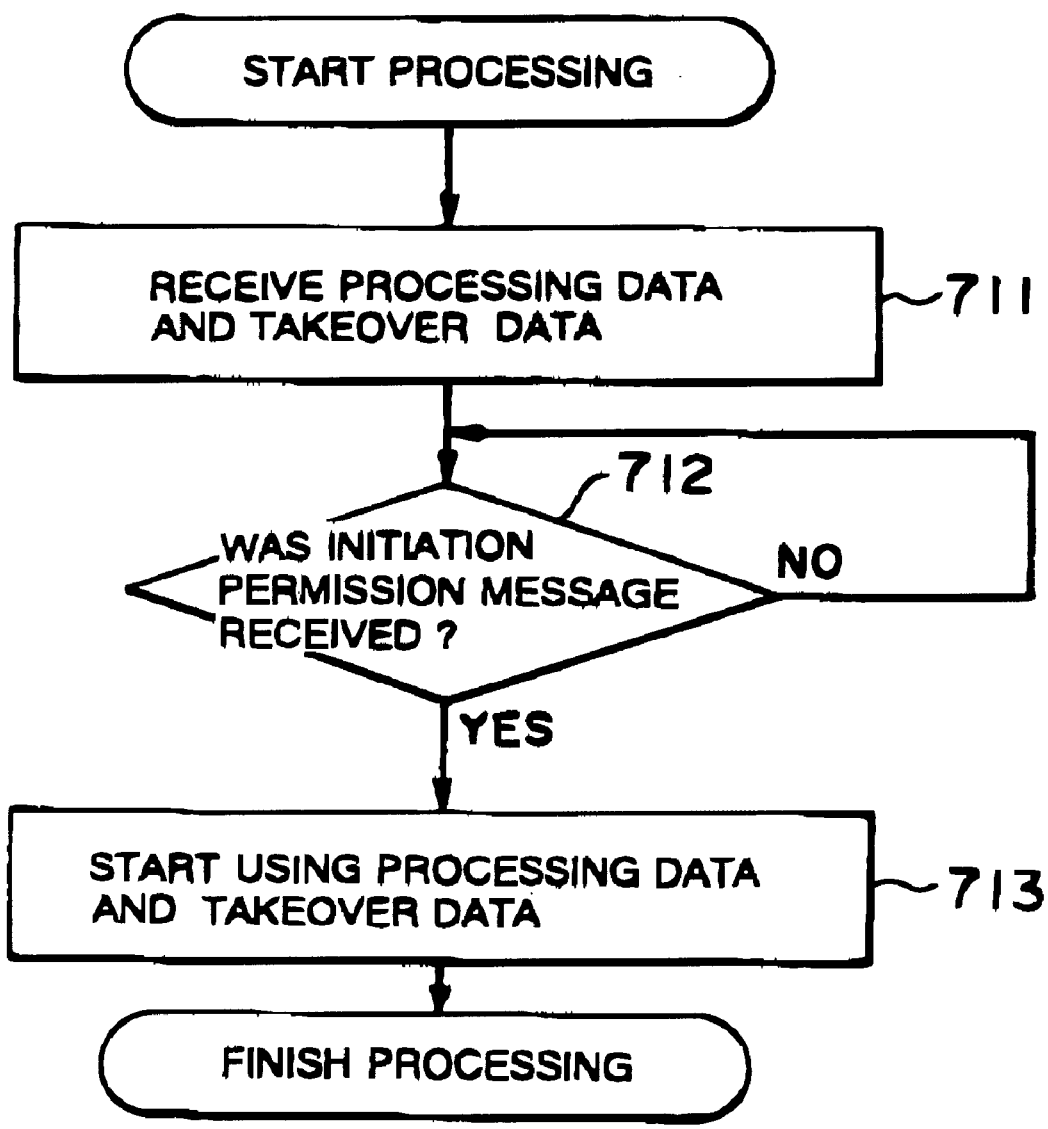
FIG. 21 is a flowchart indicating a method for taking over data in a spare system computer of the embodiment 7.

On the other hand, in the computer 80, the process is executed in accordance with the flowchart shown in FIG. 21. Namely, the data input unit 61 receives the processing data and the takeover data from the current system computer 20a (Step 711). Then, the message determination unit 62 determines whether the initiation permission message was received from the current system computer 20a or not (Step 712).

Hereupon, the data use initiation unit 63 starts the use of the processing data and the takeover data from a time that the initiation permission message was received, when the initiation permission message was received from the current system computer 20a (Step 713).

Namely, the processing time of the data can be shortened if the process is started when the takeover data was reflected by the spare system computer 30a.

Further, the takeover time of the data can be shortened, compared with the case that the processing data is transferred after the takeover data was transferred as the embodiment 2, since the takeover data and the processing data are transferred simultaneously.

Besides, in the embodiments from 2 to 7, the spare system computer operated as a current system computer when there was some trouble with the current system computer. In this case, the computer 20a which has already been a current system computer can be restored to be used as a spare system computer. The construction should be like the construction of the embodiment 2 in such case.

What is claimed is:

1. A system for taking over data comprising:

first data processing means for processing a processing data following an execution of a program;

second data processing means for taking over a takeover data necessary for resuming a process from said first data processing means, when there is a malfunction with said first data processing means;

volatile storage means for storing the takeover data and the processing data;

change means for changing contents of the takeover data stored in said volatile storage means following the execution of the program by said first data processing means;

nonvolatile storage means for storing the changed takeover data, which nonvolatile storage means is connected to said first data processing means and said second data processing means;

demanding means for demanding a transmission of the processing data from said volatile storage means to said nonvolatile storage means and a network following the execution of the program by said first data processing means;

rewriting means for rewriting the changed takeover data stored in said nonvolatile storage means into the takeover data in said nonvolatile storage means, when said demanding means demands the transmission; and counting means for counting a predetermined time starting from a time that the takeover data changed by said change means was stored in said volatile storage means, wherein said rewriting means rewrites the takeover data from said nonvolatile storage means into the changed takeover data stored in said volatile storage means, when the predetermined time was counted by said counting means.

2. A system for taking over data comprising:

first data processing means for processing a processing data following an execution of a program;

second data processing means for taking over a takeover data necessary for resuming a process from said first data processing means, when there is a malfunction with said first data processing means;

volatile storage means for storing the takeover data and the processing data;

change means for changing contents of the takeover data stored in said volatile storage means following the execution of the program by said first data processing means;

nonvolatile storage means for storing the changed takeover data, which nonvolatile storage means is connected to said first data processing means and said second data processing means;

demanding means for demanding a transmission of the processing data from said volatile storage means to said nonvolatile storage means and a network following the execution of the program by said first data processing means;

rewriting means for rewriting the changed takeover data stored in said nonvolatile storage means into the takeover data in said nonvolatile storage means, when said demanding means demands the transmission;

data input means for receiving the processing data from said first data processing means;

message determination means for determining whether an initiation permission message was received from said first data processing means; and data use initiation means for using the processing data starting from a time that the initiation permission message was received from said first data processing means, wherein said rewriting means transmits the processing data through the network to a third data processing means and rewrites the takeover data stored in said nonvolatile storage means into the takeover data stored in said volatile storage means, and transfers an initiation permission message for permitting said third data processing means to use the processing data to said third data processing means at a time that rewriting of the takeover data has ended.

3. A system for taking over data comprising:

first data processing means for processing a processing data following an execution of a program, which first data processing means is connected to a network;

second data processing means for transferring a takeover data necessary for resuming a process from the first data processing means when there is a malfunction with said first data processing means, which second data processing means is connected to the network;

first volatile storage means for storing the takeover data and the processing data;

change means for changing contents of the takeover data stored in said first volatile storage means following the execution of the program by said first data processing means;

second volatile storage means for storing the takeover data, which second volatile storage means is provided with said second data processing means;

demanding means for demanding a transmission of the processing data from said volatile storage means to the network and a nonvolatile storage means which is connected to said first data processing means following the execution of the program by said first data processing means;

rewriting means for rewriting the takeover data stored in said second volatile storage means into the takeover data in said first volatile storage means when said demanding means demands the transmission;

data input means for receiving the processing data from said first data processing means;

message determination means for determining whether the initiation permission message was received from said first data processing means; and data use initiation means for starting to use the processing data starting from a time that the initiation permission message was received from said first data processing means, wherein said rewriting means transmits the processing data to a third data processing means and rewrites the takeover data stored in said second volatile storage means into the takeover data stored in said first volatile storage means at the same time, and transfers an initiation permission message for permitting said third data processing means to use the processing data to said third data processing means when rewriting of the takeover data has ended.

4. A method for taking over data in which a first data processing unit processes a processing data following an execution of a program, and takes over a takeover data necessary for resuming a process from said first data processing unit to a second data processing unit, when there is a malfunction with said first data processing unit, comprising:

a volatile storage step for storing the takeover data and the processing data in a volatile memory;

a change step for changing contents of the takeover data stored in the volatile memory following the execution of the program by said first data processing unit;

a demanding step for demanding a transmission of the processing data from said volatile memory to a nonvolatile memory and a network following the execution of the program by said first data processing means;

a rewriting step for rewriting the takeover data stored in the nonvolatile memory into the takeover data when the transmission is demanded by the demanding step;

a perception step for perceiving the malfunction when associated with said first data processing unit;

a determination step for determining whether the malfunction which occurred in said first data processing unit destroys the takeover data and the processing data stored in said volatile memory; and a readout step for reading the takeover data from said volatile memory and from said takeover data stored in the nonvolatile memory into said second data processing unit, when the malfunction does not destroy the takeover data and the processing data stored in said volatile memory.

5. A method for taking over data in which a first data processing unit processes a processing data following an execution of a program, and takes over a takeover data necessary for resuming a process from said first data processing unit to a second data processing unit, when there is a malfunction with said first data processing unit, comprising:

a volatile storage step for storing the takeover data and the processing data in a volatile memory;

a change step for changing contents of the takeover data stored in the volatile memory following the execution of the program by said first data processing unit;

a demanding step for demanding a transmission of the processing data from said volatile memory to a nonvolatile memory and a network following the execution of the program by said first data processing means;

a rewriting step for rewriting the takeover data stored in the nonvolatile memory into the takeover data when the transmission is demanded by the demanding step; and a counting step for counting a predetermined time starting from a time that the takeover data in said volatile memory is changed by the change step, wherein said rewriting step rewrites the takeover data in said nonvolatile memory into the takeover data in said volatile memory, when the predetermined time is counted by the counting step.

6. A method for taking over data in which a first data processing unit processes a processing data following an execution of a program, and takes over a takeover data necessary for resuming a process from said first data processing unit to a second data processing unit, when there is a malfunction with said first data processing unit, comprising:

a volatile storage step for storing the takeover data and the processing data in a volatile memory;

a change step for changing contents of the takeover data stored in the volatile memory following the execution of the program by said first data processing unit;

a demanding step for demanding a transmission of the processing data from said volatile memory to a nonvolatile memory and a network following the execution of the program by said first data processing means;

a rewriting step for rewriting the takeover data stored in the nonvolatile memory into the takeover data when the transmission is demanded by the demanding step;

an input step for receiving the processing data from said first data processing unit;

a determination step for determining whether an initiation permission message was received from said first data processing unit; and a use initiation step for starting to use the processing data from a time that the initiation permission message was received, when the initiation permission message was received from said first data processing unit, wherein said rewriting step transmits the processing data through the network to a third data processing unit and rewrites the takeover data stored in said nonvolatile memory into the takeover data stored in said volatile memory, and transfers an initiation permission message for permitting said third data processing unit to use the processing data to said third data processing unit when rewriting of the takeover data has ended.

7. A method for taking over data in which a first data processing unit connected to a network processes a processing data following an execution of a program, takes over a takeover data necessary for resuming a process from said first data processing unit to second data processing unit connected to the network, when there is a malfunction with said first data processing unit, comprising:

a first storage step for storing the takeover data and the processing data in a first volatile memory;

a second storage step for storing the takeover data and the processing data in a second volatile memory;

a change step for changing contents of the takeover data stored in said first volatile memory following the execution of the program by said first data processing unit;

a demanding step for demanding the transmission of the processing data from said first volatile memory to a nonvolatile memory and the network following the execution of the program by said first data processing means;

a rewriting step for rewriting the takeover data stored in said second volatile memory into the changed takeover data when the transmission demand was issued;

an input step for receiving the processing data from said first data processing unit;

a determination step for determining whether the initiation permission message was received from said first data processing unit; and a use initiation step for starting to use the processing data at a time that the initiation permission message was received, when an initiation permission message was received from said first data processing unit, wherein said rewriting step transmits the processing data through the network to a third data processing unit and rewrites the takeover data stored in said second volatile memory into the takeover data stored in said first volatile memory, and transfers an initiation permission message for permitting said third data processing unit to use the processing data to said third data processing unit when the rewriting of the takeover data has ended.

* * * * *